US010125260B2

(12) United States Patent
Pugh et al.

(10) Patent No.: US 10,125,260 B2
(45) Date of Patent: Nov. 13, 2018

(54) LOW AROMATIC CONTENT BIO-MASS FILLERS FOR FREE RADICAL AND IONIC CURE THERMOSET POLYMERS

(71) Applicants: Coleen Pugh, Akron, OH (US); Paula Watt, Ashtabula, OH (US); Brinda Mehta, Carlisle, PA (US)

(72) Inventors: Coleen Pugh, Akron, OH (US); Paula Watt, Ashtabula, OH (US); Brinda Mehta, Carlisle, PA (US)

(73) Assignee: The University of Akron, Akron ( * ) Notice: Subject to any disclaimer, the term of this patent is extended or adjusted under 35 U.S.C. 154(b) by 0 days.

(21) Appl. No.: 15/119,013

(22) PCT Filed: Feb. 19, 2015

(86) PCT No.: PCT/US2015/016587
§ 371 (c)(1),
(2) Date: Aug. 15, 2016

(87) PCT Pub. No.: WO2015/127053
PCT Pub. Date: Aug. 27, 2015

(65) Prior Publication Data
US 2017/0058125 A1 Mar. 2, 2017

Related U.S. Application Data

(60) Provisional application No. 61/941,537, filed on Feb. 19, 2014.

(51) Int. Cl.
*C08L 97/02* (2006.01)
*C08L 63/00* (2006.01)
*C08H 1/00* (2006.01)
*C08H 8/00* (2010.01)
*C08L 33/00* (2006.01)
*C08L 89/00* (2006.01)
*C08L 67/06* (2006.01)
*C08L 79/08* (2006.01)
*C08L 101/00* (2006.01)

(52) U.S. Cl.
CPC ............... *C08L 97/02* (2013.01); *C08H 1/00* (2013.01); *C08H 8/00* (2013.01); *C08L 33/00* (2013.01); *C08L 63/00* (2013.01); *C08L 67/06* (2013.01); *C08L 79/085* (2013.01); *C08L 89/00* (2013.01); *C08L 101/00* (2013.01)

(58) Field of Classification Search
CPC ...................................................... C08L 97/02
See application file for complete search history.

(56) References Cited

U.S. PATENT DOCUMENTS

| 4,826,881 | A | * | 5/1989 | Ferguson | C08F 299/0478 521/149 |
|---|---|---|---|---|---|
| 5,599,875 | A | * | 2/1997 | Depping | C09D 167/06 427/372.2 |
| 6,506,223 | B2 | | 1/2003 | White | |
| 9,327,426 | B2 | * | 5/2016 | Yano | B29B 15/08 |
| 2002/0151622 | A1 | * | 10/2002 | Tock | C08L 101/00 524/27 |
| 2006/0043629 | A1 | * | 3/2006 | Drzal | C08L 29/04 264/140 |
| 2011/0263756 | A1 | * | 10/2011 | Yano | C08J 5/045 524/13 |
| 2013/0005866 | A1 | * | 1/2013 | Yano | B29B 15/08 524/13 |
| 2016/0215088 | A1 | * | 7/2016 | Omonov | C08J 5/045 |

FOREIGN PATENT DOCUMENTS

WO 2009014842 A1 1/2009

OTHER PUBLICATIONS

Rong et al., Composites Science and Technology 61 (2001) 1437-1447.*
Pascault et al. (General Concepts about Epoxy Polymers, Epoxy Polymers, 2010). (Year: 2010).*
Sreekumar et al. (Composites Science and Technology, 67, 2007, 453-461) (Year: 2007).*
Li et al. (Composites Science and Technology, vol. 60, No. 11, 2000, 2037-2055) (Year: 2000).*
Remesh et al., Composites: Part B, 48, 2013, 1-9 (Year: 2013).*
Economic Aspects of Coir Fibre Production http://www.fao.org/docrep/005/Y3612E/y3612e05.htm, 2018 (Year: 2018).*
Ioelovic, M et al. Study of Enzymatic Hydrolysis of Mild Pretreated Lignocellulosic Biomasses. BioResources. Feb. 2012, vol. 7, No. 1, pp. 1040-1052. [online], [retrieved on Apr. 20, 2015]. Retrieved from the Internet <URL: https://www.ncsu.edubioresourcesBioRes_07BioRes_07_1_1040_Ioelovich_Morag_Enz_Hydroi_Mild_Lignocei_Biomass_2426.pdf>; p. 1045, table 2.
Paauw, et al. Journal of Applied Polymer Science, vol. 50.1287-1293 (1993).
Lee, Reactions of Polyester Resins and the Effects of Lignin Fillers.

* cited by examiner

*Primary Examiner* — Liam J Heincer
(74) *Attorney, Agent, or Firm* — Renner Kenner Greive Bobak Taylor & Weber

(57) ABSTRACT

A filled polymer compositions and methods of preparing filled polymer that include a plant biomass filler a plant biomass with a low aromatic carbon content, and (a thermoset polymer. The plant biomass filler may have a low lignin content or no lignin at all. The filler may also be heat treated to a temperature that provides a plant biomass filler with less than 49% aromatic content.

17 Claims, 16 Drawing Sheets

LOW AROMATIC CONTENT BIO-MASS FILLERS FOR FREE RADICAL AND IONIC CURE THERMOSET POLYMERS

CROSS-REFERENCE TO RELATED APPLICATIONS

This application claims priority from U.S. Provisional Patent Application No. 61/941,537 filed on Feb. 19, 2014, the contents of which are incorporated herein by reference.

FIELD OF THE INVENTION

One or more embodiments related to polymers and method of preparing polymers with a plant biomass filler containing low aromatic content.

BACKGROUND OF THE INVENTION

For decades wood flour has been used in wood plastic composites (WPC) for decking, fencing, and other applications. These products use a thermoplastic matrix resin, typically high density polyethylene (HDPE) or polyvinylchloride (PVC) which melts at elevated temperature so it can take the product form, via extrusion or molding processes, and upon cooling solidifies. In recent years other plant biomass fillers have been used in this manner and efforts to commercialize the fillers and concentrates for the thermoplastic industry have been gaining momentum.

In contrast, efforts to use wood flour and other bio-mass fillers in thermoset chemistries has been unsuccessful at 100% loading replacement for mineral fillers. Unlike thermoplastics, many thermosets historically have used high loadings of mineral fillers. Thermoset matrix, rubber and elastomer systems polymerized by use of free radical or ionic initiators are typically either liquid at room temperature or can be melted to a flowable viscosity prior to onset of cure. Once initiation is sufficient to start the polymerization the reaction auto accelerates and the irreversible cross-linking occurs. Once solidified the material cannot be melted to a molten state. Literature references note issues with inhibition and retardation of the polymerization mechanisms of these chain polymerizations initiated by free radical and ionic species with lignin containing plant biomass fillers. The mechanism of this interference has previously not been understood.

It is ironic that plant biomass filler technology has taken a quicker foothold with thermoplastics because historically they did not typically make use of the high density mineral fillers. Use of a lightweight bio-mass filler is desirable for thermosets because with a filler density of only ~1 g/cc, vs. ~2.5 g/cc for mineral fillers, and loadings as high as 36% based on volume the resulting composite weight can be reduced by more than 30% with equivalent resin and reinforcement content. Because precursors for the bio-mass fillers are abundant, can be locally sourced, and are easily harvested and processed they are projected to be cost neutral to mineral fillers on a volume basis. These advantages make the compounds utilizing the fillers attractive to transportation and aerospace applications, among others, where significant savings in fuel consumption are possible. Further the bio-mass fillers offer a reduced carbon footprint relative to mining operations, particularly when the precursor is a by-product of other products extracted or derived from the crop feedstock.

There has been a general assumption that due to the mechanical structure of lignin that its presence was an advantage as a polymer filler. Many literature references to bio-mass fillers and fibers in polymers specify lingo-cellulosic feedstocks. Many references also discuss heat treating of bio-mass fillers to reduce the hydrophilic nature.

Past efforts to utilize bio-mass based fillers in thermosets have been limited to partial replacement of 10-30% of total filler content due to the polymerization inhibition by the fillers. When high loadings of these fillers are used the resulting matrices have lower mechanical properties, increased water absorption and lower glass transition temperatures than neat or mineral filled analogs.

With fillers containing low aromatic content, however, this surprisingly is not the case. In our research we have discovered that selection of the bio-mass feedstock and design of modifying processes can be used to avoid or eliminate the inhibition problem. In fact we have found that fillers ground from low lignin and low aromatic content bio-mass do not have the inhibiting affect. Our studies have demonstrated that treatments involving heat aggravate the inhibition effect of lignin-cellulosics and can create the issue even with low-lignin feedstocks. Fourier Transform Infrared (FTIR), Elemental Analysis (EA) and Nuclear Magnetic Resonance (NMR) studies have indicated formation of aromatic species in these treated fillers that resemble lignin and its decomposition products.

Thus, in spite of ongoing efforts to use bio-mass based fillers in thermosets and decades of non-success, we have discovered that avoidance, elimination or control of aromatic species level in the filler is critical for use in thermoset composites.

SUMMARY OF THE INVENTION

A first embodiment provides a filled polymer composition comprising: (i) about 15% to about 50% of a plant biomass filler comprising a plant biomass with less than 49% aromatic carbon content; and (ii) about 85% to about 50% of a thermoset polymer.

A second embodiment provides a filled polymer composition as in the first embodiment, where the plant biomass filler comprises a plant biomass with less than 40% aromatic carbon content.

A third embodiment provides a filled polymer composition as in the either the first or second embodiment, where the plant biomass filler comprises a plant biomass with less than 36% aromatic carbon content.

A fourth embodiment provides a filled polymer composition as in any of the first through third embodiments, where the plant biomass filler consists of a plant biomass with less than 49% aromatic carbon content.

A fifth embodiment provides a filled polymer composition as in any of the first through fourth embodiments, where the filled polymer composition includes about 20% to about 50% of a plant biomass filler.

A sixth embodiment provides a filled polymer composition as in any of the first through fifth embodiments, where the plant biomass has less than 8% lignin content A seventh embodiment provides a filled polymer composition as in any of the first through sixth embodiments, where the plant biomass has been processed to reduce the lignin content.

An eighth embodiment provides a filled polymer composition as in any of the first through seventh embodiments, where the plant biomass is selected from soy, sisal, and *miscanthus*.

A ninth embodiment provides a filled polymer composition as in any of the first through eighth embodiments, where the thermoset polymer is a chain-polymerized thermoset polymer.

A tenth embodiment provides a filled polymer composition as in any of the first through ninth embodiments, where the chain-polymerized thermoset polymer is selected from free-radical cured and ionically cured systems.

An eleventh embodiment provides a composite material comprising a fiber, particulate filler, or combination thereof, and the filed polymer composition of claim of any of the above embodiments.

A twelfth embodiment provides a composite material as in the eleventh embodiment where the composite material further includes an inhibitor, accelerator, catalyst, pigment, dye, mold release agent, thixotrope, rheology modifier, compatibilizing agents, or combination thereof.

A thirteenth embodiment provides a method of preparing a filed polymer composition comprising: (i) preparing the a resin blend by mixing about 15% to about 50% of a plant biomass filler comprising a plant biomass with less than 49% aromatic carbon content, and about 85% to about 50% of a thermoset polymer; (ii) polymerizing the chain-polymerizable thermoset polymer.

A fourteenth embodiment provides a method as in the thirteenth embodiment, where the plant biomass filler has been heat treated at a temperature from about 20° C. to about 400° C.

A fifteenth embodiment provides a method as in either the thirteenth or fourteenth embodiment, where the plant biomass filler has been heat treated at a temperature from about 150° C. to about 375° C.

A sixteenth embodiment provides a method as in any of the thirteenth through fifteenth embodiments, where the plant biomass has been processed to reduce the lignin aromatic carbon content by removal of lignin.

A seventeenth embodiment provides a method as in any of the thirteenth through sixteenth embodiments, where the plant biomass has less than 8% lignin content An eighteenth embodiment provides a filled polymer prepared as in any of the thirteenth through seventeenth embodiments.

A nineteenth embodiment provides a filled polymer composition comprising: (i) a filler where the total filler content consists of a plant biomass with less than 49% aromatic carbon content; and (ii) a thermoset polymer.

DETAILED DESCRIPTION OF ILLUSTRATIVE EMBODIMENTS

Figure 1:
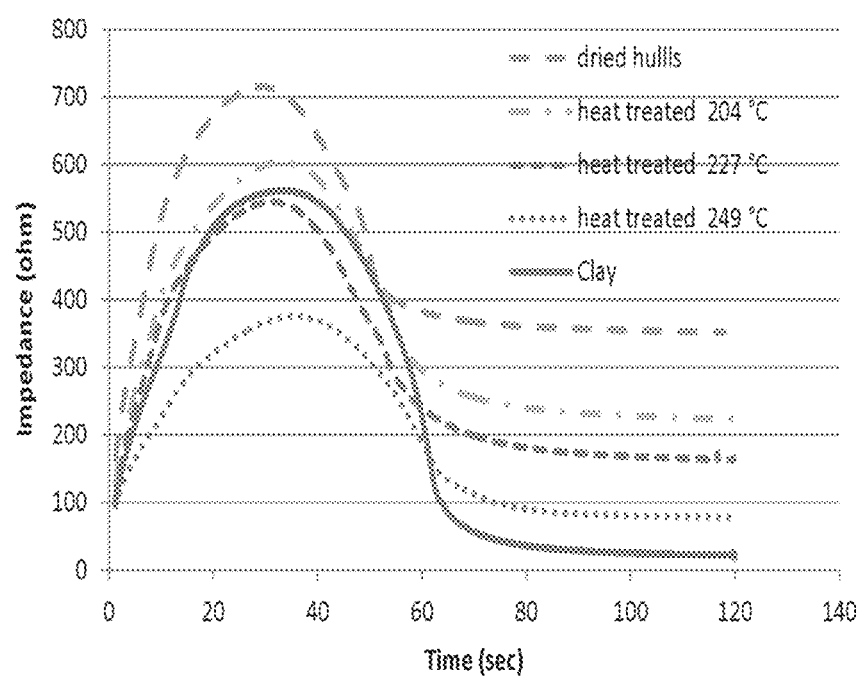
FIG. 1 provides a chart of dielectric impedance curves determined during the curing of filled polymer compositions of dried and heat treated soy compared to clay.

One or more embodiments are directed to a filled polymer composition comprising a thermoset polymer and a plant-biomass filler with a low aromatic content. Advantageously, it has been found that plant biomass with a low aromatic content allows for filled thermosetting polymers to be produced with a high filler loading without inhibiting the curing of the thermosetting polymer. In one or more embodiments, the filled thermosetting polymers may have a filler that consists solely of a low aromatic content plant biomass without any additional filler such as an inorganic filler.

Those skilled in the art will recognize that a thermosetting polymer is a polymer that cures irreversibly. Thermosetting polymers may simply be referred to as thermosets. While the term thermosetting is used, thermosets are not necessarily cured through heat. In one or more embodiments, the thermoset may be a free-radical cured system or an ionically cured system. In one or more embodiments, the thermoset polymer may be a chain-polymerizable thermoset polymer. Chain-polymerizable thermoset polymers are prepared through a polymerization technique where a monomer is added to the reactive center of growing polymer chain to produce a new reactive center. Chain-growth polymerization may involve a reactive center introduced by an initiator. The most widely used reactive sites are double or triple carbon-carbon bonds, but others exist. For example, ring opening polymerizations that involve an initiator with a reactive site also undergo chain polymerization. Specific examples of thermosets include, but are not limited to, unsaturated polyesters, bismaleimides, acrylics, and epoxies. In one or more embodiments, unsaturated polyesters, bismaleimides or acrylics may be polymerized using free-radical chain polymerization. In other embodiments, epoxides may be polymerized using an ionic ring opening polymerization.

Plant-biomass fillers are plant matter or plant derived matter that may "fill" or replace a portion of a polymer. Plant derived matter includes plant matter that has bean treated to reduce the hydrophobicity of the plant matter. Suitable treatments to reduce hydrophobicity include heat treatments and chemical treatments. Suitable plant matter for the preparation of plant biomass fillers includes, seed, stalk, husk, grass, leaves, roots, grains, coir, meal, bark, trunk, and branches.

Plant-biomass fillers may optionally be dried before use. In one or more embodiments, where plant-biomass filler is dried, the drying may be performed at a temperature from about 20° C. to about 50°. Drying may be performed from about 8 hours to about 48 hours. In certain embodiments, drying may be performed under vacuum.

In one or more embodiments, the plant-biomass filler may be plant matter that is used in it natural state without reducing the size by cutting or grinding. In other embodiments, the plant-biomass filler may be plant matter that is cut or ground. In one or more embodiments, the plant-biomass filler may be plant matter that is ground to a flour. In these or other embodiments, the plant matter may be ground using, for example a mortar and pestle, a pulverizer, a wet mill attritor, or a dry grind attritor. The plant-biomass flour may be characterized by average particle size, which may be measured by light scattering analysis. A suitable device for light scattering analysis is a MicroTrac Particle Size Analyser laser diffraction system. In one or more embodiments, where the plant-biomass filler is a flour the average particle size may be less than 50,000µ in other embodiments less than 5000µ, and in other embodiments less than 500µ. In one or more embodiment, the average particle size may be greater than 0.5µ, in other embodiments greater than 1µ, and in other embodiments greater than 4µ. In one or more embodiments, the average particle size may be from about 0.5µ to about 50,000µ, in other embodiments from about 1µ to about 5000µ, and in other embodiments from about 4µ to about 500µ.

In one or more embodiments, the plant biomass may be characterized by an advantageous aromatic content, which may be measured by $^{13}C$ nuclear magnetic resonance imaging (NMR). The aromatic content in the plant biomass may be characterized by the percent weight of the aromatic content of the dried plant-biomass filler. In one or more embodiments, the plant biomass is characterized by an aromatic content that is less than 49%, in other embodiments less than 45%, in other embodiments less than 40%, in other embodiments less than 36%, in other embodiments less than 35%, in other embodiments less than 30%, in other embodiments less than 25%, in other embodiments less than 20%, in other embodiments less than 15%, in other embodiments less than 10%, and in other embodiments less than 5%.

The plant matter used to prepare a plant-biomass filler may contain lignin as all or a portion of the plant matter's aromatic content. Lignin, a polymer of aromatic alcohols, has generally been considered advantageous in polymer fillers due to its mechanical properties. However, it has been found that lignin, as part of the aromatic content of the plant-biomass filler hinders the polymer's ability to cure. In certain embodiment, plant matter completely devoid of lignin may be used for the plant-biomass polymer filler. In one or more embodiments, a plant matter with a low percentage of lignin may be use for the plant-biomass polymer filler. Suitable plant matter with a low amount of lignin may be obtained from soy, sisal, and *miscanthus*.

In one or more embodiments, the plant-biomass polymer filler may be processed to reduced the lignin content. Suitable methods of removing lignin include caustic extraction, acidic extraction, hot water extraction and ionic liquid extraction.

The lignin content in the plant biomass may be characterized by the percent weight of the lignin content of the dried plant-biomass filler, which may be measured by $^{13}C$ nuclear magnetic resonance imaging (NMR). In one or more embodiments, the plant-biomass filler is characterized by an lignin content that is less than 15%, in other embodiments less than 9%, in other embodiments less than 8%, in other embodiments less than 7%, in other embodiments less than 6%, in other embodiments less than 5%, in other embodiments less than 4%, in other embodiments less than 3%, in other embodiments less than 2%, in other embodiments less than 1%.

As noted above, the plant-biomass fillers may be heat treated to reduce hydrophobicity. Suitable devices for heat treating the plant-biomass fillers include, but are not limited to, ovens, muffle furnaces, autothermal torrefaction devices, and mobile torrefaction devices. Autothermal and mobile torrefaction devices are described in U.S. Pat. No. 8,304,590, which is incorporated herein by reference.

While heat treatment reduces the hydrophobicity of the plant-biomass filler, if the heat treatment is in excess, the percentage of aromatics in the plant-biomass filler will increase. Thermal decomposition may be exothermic, so the temperature values for heat treatment may best be described as the value measured in the heat treatment device. In one or more embodiment, the plant biomass may be heat treated at a temperature of less than 400° C., in other embodiments less than 375° C., in other embodiments less than 350° C., and in other embodiments less than 300° C. In one or more embodiment, the plant biomass may be heated at a temperature of greater than 20° C., in other embodiments greater than 150° C., in other embodiments greater than 200° C., and in other embodiments greater than 220° C. In one or more embodiments, the biomass may be heated at a temperature from about 20° C. to about 400° C., the biomass may be heated at a temperature from about 150° C. to about 375° C., in other embodiments from about 200° C. to about 350° C., and in other embodiments from about 220° C. to about 300° C.

In one or more embodiment, the plant biomass may be heat treated greater than 0.1 min, in other embodiments greater than 1 min, and in other embodiments greater than 3 min. In one or more embodiment, the plant biomass may be heat treated for less than 480 min, in other embodiments less than 60 min, and in other embodiments less than 30 min. In one or more embodiments, the biomass may be heated from about 0.1 min to about 480 min, in other embodiments from about 1 min to about 60 min, and in other embodiments from about 3 min to about 30 min.

In one or more embodiments, were the plant-biomass filler is a flour and heat treated, the plant biomass filler may be heat treated before it is ground into a flour. In other embodiments, the plant biomass filler may be heat treated after it is ground into a flour.

In one or more embodiments, heat treatment may be performed in a low-oxygen environment. In these or other embodiments, some or all of the gas may be replaced with nitrogen. In other embodiments, the heat treatment may be performed in a vacuum. Certain embodiments, may use recycled gas from thermal decomposition. The amount of oxygen in the environment may be characterized by volume percent. In one or more embodiments, the low-oxygen environment has an oxygen level less than atmospheric levels, in other embodiments less than 20%, in other embodiments less than 15%, in other embodiments less than 10%, in other embodiments less than 5%, and in other embodiments less than 1%. In other or more embodiments, the environment may be oxygen free.

In one or more embodiments, a filled polymer composition may be prepared by mixing the plant-biomass filler with a thermoset polymer mixture and curing the thermoset polymer mixture to prepare a thermoset polymer. The thermoset polymer mixture and the plant-biomass filler may be mixed by any conventional means to prepare the filled polymer composition.

In one or more embodiments, the thermoset polymer mixture includes the precursor to a thermoset polymer. A thermoset polymer precursor when cured forms a thermoset polymer. Examples of thermoset polymer precursors include monomers, oligomers, and pre-polymers. The thermoset polymer mixture may also include one or more of the following solvents, catalysts dispersants, hardeners, curatives, initiators, promoters, cross-linking agents, inhibitors, accelerators, and tougheners. In one or more embodiments, the thermoset polymer precursor may be cured by thermal radiation, UV radiation, and visible light radiation, free radical initiation, anionic initiation, and cationic initiation.

In one or more embodiments, the filled polymer composition further includes pigment, dye, mold release agent, thixotrope, rheology modifier, compatibilizing agents, or combinations thereof.

In one or more embodiments, the filled polymer composition may be characterized by the weight percent of plant-biomass filler in the composition. In one or more embodiments, the weight percent of plant-biomass filler is at least 5%, in other embodiments at least 10%, in other embodiments at least 12%, in other embodiments at least 15%, in other embodiments at least 20%, in other embodiments at least 25%, in other embodiments at least 30%. In these or other embodiments, the weight percent of plant-biomass filler is at most 80%, in other embodiments at most 70%, in other embodiments at most 65%, in other embodiments at most 60%, in other embodiments at most 55%, in other embodiments at most 50%, and in other embodiments at most 40%. In certain embodiments the weight percent of plant-biomass filler is from about 5% to about 80%, in other embodiments from about 10% to about 70%, in other embodiments from about 12% to about 65%, in other embodiments from about 15% to about 60%, in other embodiments from about 20% to about 55%, in other embodiments from about 25% to about 50%, and in other embodiments from about 30% to about 40%.

In one or more embodiments, the filled polymer composition may be characterized by the weight percent of the thermoset polymer mixture in the composition. In one or more embodiments, the weight percent of the thermoset polymer mixture is at least 20%, in other embodiments at least 30%, in other embodiments at least 35%, in other embodiments at least 40%, in other embodiments at least 45%, in other embodiments at least 50%, and in other embodiments at least 60%. In these or other embodiments, the weight percent of the thermoset polymer mixture at most 95%, in other embodiments at most 90%, in other embodiments at most 88%, in other embodiments at most 85%, in other embodiments at most 80%, in other embodiments at most 75%, and in other embodiments at most 70%. In certain embodiments the weight percent of the thermoset polymer mixture is from about 20% to about 95%, in other embodiments from about 30% to about 90%, in other embodiments from about 35% to about 88%, in other embodiments from about 40% to about 85%, in other embodiments from about 45% to about 80%, in other embodiments from about 50% to about 75%, and in other embodiments from about 60% to about 70%.

In one or more embodiments, the filled polymer composition may be included in a composite material. In these or other embodiments, the composite material may include the filled polymer composition and a fiber, particulate filler or combination thereof. Suitable fibers include, but are not limited to glass, carbon, cellulosics, and natural fibers. Suitable particulate fillers include, but are not limited to calcium carbonate, clay and alumina trihydrate.

While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

Examples

Materials

The untreated soy flour (UTSF) was Honeysoy® 90 PDI defatted soya flour provided by CHS Inc. This grade is a high solubility, enzyme active 100% soy flour with minimal heat treatment. The minimum protein specification for this grade is 48%, and the total carbohydrates is 44% with 19% dietary fiber. The flour is granulated to pass a minimum of 95% through a 200 mesh alpine sieve. This translates to less than 75 micron diameter particles. The untreated soy meal (UTSM) was Bunge solvent extracted soy meal purchased from Rome Feed Inc. The minimum protein specification is 47%, crude fiber is not more than 3.5%, and crude fat is not less than 0.5%. The untreated soy hulls (UTSH) were Bunge soybean hulls with a minimum protein level of 9%, ≥0.5% crude fat, and ≤38% crude fiber. This granular material has a bulk density of 0.37 g/cc. Kraft lignin powder was procured from Sigma-Aldrich. The weight average molecular weight for the sample was $M_w=1.0\times10^4$ g/mol. Chemically treated soy fillers were supplied by the Pugh Research Group in the Polymer Science Department at The University of Akron as described by Watt.[20]

For the resin casting water absorption experiments, thermoset resin AOC S903, a dicyclopentadiene propylene glycol maleic anhydride-based polyester dissolved in 30% styrene, was initiated with Noury F-85, 40% methyl ethyl ketone peroxide and Shepherd cobalt octoate, a 12% cobalt in mineral spirits accelerator.

For BMC screening experiments, maleated acrylated epoxidized soy oil in 30% styrene (MAESO® resin) from Dixie Chemical was used with Premix R-158, a low profile additive (LPA) comprised of a thermoplastic dissolved in 30% styrene. The curative was Trigonox C, tert-butylperoxy benzoate. Norac Coad 27P zinc stearate (ZnSt) was the mold release; Omya 5, 5 micron calcium carbonate ($CaCO_3$), was the filler; and ⅛" chopped PPG 3075 was used for reinforcement.

For the remaining BMC and SMC compounds, AOC S903 and Premix R-158 were again employed. Additional styrene from Total Petrochemical was included for viscosity reduction. The cure package included Trigonox BPIC-C75 (tert-butyl peroxy isopropyl carbonate peroxide) from Akzo-Nobel, Chromoflo's IN-91029 inhibitor (a solution of 2,6-di-tertbutyl-p-cresol in vinyl toluene) and Chempak's POWER BLOC 12.5PC (a 12.5% solution of parabenzoquinone). Chromoflo's black CF-20737 pigment concentrate was used as well as their AM 9033 magnesium oxide thickener slurry. Norac Coad 27P zinc stearate (ZnSt) and Norac Coad 10C calcium stearate (CaSt) were used for mold release. For the control samples, the mineral filler used was BASF ASP200 clay with a particle size where 85% passes through a 325 mesh (<44 um). PPG 3075 glass fiber (chopped ⅛") was used for reinforcement.

For extraction studies, reagent grade toluene and methanol from Fisher Scientific were used. Styrene from Total Petrochemical, S903 AOC resin and Trig 122C80 (1,1-di-(tert-amylperoxy)cyclohexane) from Akzo-Nobel were used for DSC samples.

Thermal Treatments
ATP/NCSU Bench Scale

A convection oven was used to process soy hulls. Roughly 1500 g of the precursors were spread on a baking sheet and covered with aluminum foil. The foil was perforated to allow for volatile escape. Soon after loading into the oven preheated to 250 or 288° C., copious amounts of gasses were noted before tailing off, at which point the samples were unloaded from the oven and allowed to cool, still covered, at ambient temperature.

ATP/NCSU Pilot Scale Continuous

A continuous screw feed torrefactor was used to process soy hulls. The continuous screw feed torrefactor utilizes the gasses generated after initial decomposition of the feedstock as fuel in a closed loop system depicted. The design results in a low-oxygen environment with typical temperatures reaching 225-400° C., depending on the initial set point temperature and the fuel content of the precursor material. The combustion gasses generate as much as 80% of the torrefaction process heat.

The set point for the process was targeted at 288° C. The meal sample exotherm reached roughly 300° C. The hull sample provided more self-fueling of the process resulting in an overshoot to 400° C., at which point the process was shutdown. Machine design for future equipment will have mechanisms to divert off-gasses from the process and more effectively manage the process temperature.

ATP/NCSU Pilot Scale Batch

A batch scale torrefaction unit at North Carolina State University (NCSU) was also used to process 90 kg of hulls at 500° C. for 10 min.

Premix Muffle Furnace Bench Scale

A Linbergh Blue® muffle furnace was used with a nitrogen ($N_2$) purge. The purge was fed through a funnel in the furnace exhaust hole with room for gasses to exit around the funnel. After a 30 min $N_2$ purge the soy, roughly 100 g in a crucible, were quickly loaded into the preheated furnace at 250° C. or 400° C. Process times were 90 minutes and 21 minutes, respectively, which corresponds to when the volatile evolution subsided. The crucibles were then pulled from the oven, placed on a screen and covered with foil until cool enough to be placed in a desiccator to complete cooling.

EarthCare® (ECP) Batch Rotary Drum Process.

Earth Care Products, Inc. manufactures torrefaction equipment based on a patented biomass conversion process. The drum was preheated to the set point temperature. Roughly 5 kg of hulls were loaded into the drum and it was closed. The drum rotation was started. Indirect heat was supplied as needed to overcome the loss of heat due to loading the ambient temperature hulls. Once the internal drum temperature had recovered to the set point, the burners shut off automatically. The biomass temperature continued to rise due to the exothermic decomposition. When the temperature inside the vessel stopped increasing, the run was stopped and the material was removed.

Grinding

Samples were ground by various methods. Small quantity samples of less than 100 g were ground using a mortar and pestle (M&P). Samples greater than 100 g were rough ground using a Holmes bench top pulverizer with a 60 mesh screen (<325 um). Finally, fine ground samples were processed at Union Process, Inc. using a 15 wet mill attritor or an SD-1 dry grind attritor where the area average mean particle size is reported (MA).

Composites Preparation and Methods
Resin Castings Water Absorption

The general procedure for the cast water absorption specimen preparation was to start with a resin that was accelerated with cobalt octoate as a master batch for each set and to hand mix methyl ethyl ketone peroxide and then the filler for each specimen. Soy filler (1 g), clay (0.8 g) or $CaCO_3$ (2 g) and resin (5 g) were used. The samples were cured out under ambient conditions and then post-baked stepwise to a final temperature of 150° C. Specimens were then submersed in deionized water in beakers for varying times. For measurements they were pulled, dried with a paper towel and weighed immediately.

BMC Compounding

A lab scale Baker Perkin double sigma blade mixer was used to make BMC from pre-blended paste masters. First the resin, low profile additive (LP), styrene, initiator, inhibitor, pigment and mold release were premixed under a high shear mixer (A). This was loaded in the mixer, followed by the filler (B), which was blended to a uniform consistency, followed by the addition of the glass fibers (D). After thorough mixing, the consistency was a fluffy bulk mix (E).

SMC Compounding

A pilot scale Finn and Fram, Inc. SMC machine was used to make the SMC samples. In the SMC process, all of the ingredients except the glass fibers were mixed under a Cowles mixer and the paste was then metered from doctor boxes onto carrier film at 2 locations. Glass was chopped to 1" lengths and sandwiched between the two paste layers. The material was festooned and advanced via a thickening reaction to a soft non-tacky elastomeric solid.

Molding

Compression molding was used for test samples and demonstration parts. Samples were molded at 150° C. for 2 min at roughly 7 MPa pressure.

Mechanical Testing

The mechanical properties of BMC were tested on samples cut from the panels (15.24 cm×15.24 cm) molded during the dielectric analysis (DEA). Specimens for SMC were either net shape molded or cut from a molded panels (30.5 cm×30.5 cm). Flexural strength and modulus were tested according to ASTM D790; tensile strength and modulus according to ASTM D638; Izod impact according to D256; and water absorption was tested according to ASTM D570.

Dielectric Analysis (DEA)

A Signature Control System SmartTrac® was used with a 2.54 cm diameter sensor embedded in a 15.24 cm×15.24 cm mold with 0.32 cm stops. Samples were molded at 150° C. for 2 min at roughly 7 MPa pressure. Impedance was measured at 1 kHz while curing at 150° C. Gel time was defined at the peak of the resulting impedance curve, and cure time was the point at which the curve plateaus to the baseline.

Elemental Analysis (EA)

Prior to EA analysis, samples were dried for 2 days under vacuum at 25° C. A Perkin Elmer Series II CHNS/O Analyzer 2400 calibrated with acetanilide was used to measure carbon, hydrogen and nitrogen contents of the filler combustibles. The remaining content was assigned to oxygen.

Thermogravimetric Analysis (TGA)

Prior to TGA testing, samples were dried under vacuum at 25° C. for 2 days and then stored in a desiccator. A Perkin Elmer TGA-7 system was ramped from 40° C. to 250° C. at 40° C./min for thermal weight loss curves under a nitrogen purge. The instrument was calibrated with 5, 10, 50 and 100 mg weights and with alumel, nickel and perkalloy wire for temperature.

Fourier Transform Infra-red Spectroscopy (FTIR)

A Nicolet Magna-IR 750 spectrometer with a nitrogen purge was used in transmission mode for filler pressed in KBr specimen. The attenuated total reflection (ATR) sampler was used for all extracted residue samples. Each sample used 64 scans and 4.0 cm$^{-1}$ resolution.

Differential Scanning Calorimetry (DSC)

A Perkin Elmer DSC-7 calorimeter with nitrogen purge was used in isothermal hold at 85° C. for the time required for the exotherm to return to baseline. Samples were sealed in gasketed aluminum pans. Indium and zinc standards were used for temperature and enthalpy calibration.

TABLE 1

Summary of Various Thermally Treated Fillers.

| Process | Precursor | Peak Temp | Time | Grind |
|---|---|---|---|---|
| Clay Control | na | na | na | 85% <44 um |
| Dried Untreated Soy Meal and Hulls | na | 25° C. w vacuum | 2 days | <325 um |
| Dried Lignin Model Filler | na | 50° C. | 3 days | as received |
| 288° C. ATP/NSU Bench Scale | Flour | 288° C. | 15 min | <325 um |
| 250° C. ATP/NSU Bench Scale | Meal | 250° C. | 35 min | <325 um |
| 288° C. ATP/NSU Bench Scale | Meal | 288° C. | 15 min | <325 um |
| 288° C. ATP/NSU Bench Scale | Hulls | 288° C. | 15 min | <325 um |
| 300° C. ATP/NCSU Pilot Scale | Meal | 300° C. | 5 min | <325 um |
| 400° C. ATP/NCSU Pilot Scale | Hulls | 400° C. | 3 min | MA = 8 um |
| 500° C. ATP/NCSU Batch Unit | Hulls | 500° C. | 10 min | MA = 7, 11, 13 um |
| 400° C. Muffle Furnace | Hulls | 400° C. | 21 min | M&P |
| 250° C. Muffle Furnace | Hulls | 257° C. | 1.5 h | <325 um |
| 204° C. ECP Pilot Scale | Hulls | 237° C. | 12 min | <325 um |
| 227° C. ECP Pilot Scale | Hulls | 262° C. | 11 min | <325 um |
| 249° C. ECP Pilot Scale | Hulls | 285° C. | 12 min | MA = 13 um |

BMC Study to Compare Various Treatments

The volumetric formula in Table 2 was used to compare BMCs with various treated soy flours supplied by the Pugh research group.

TABLE 2

BMC Formula for Treatment Comparisons.

| BMC Formula | Vol % |
|---|---|
| MAESO | 28.1 |
| LPA | 14.0 |
| Initiator | 0.6 |
| Mold Release | 4.1 |
| Filler | 36.1 |
| ⅛ in. glass | 17.0 |

Figure 7:
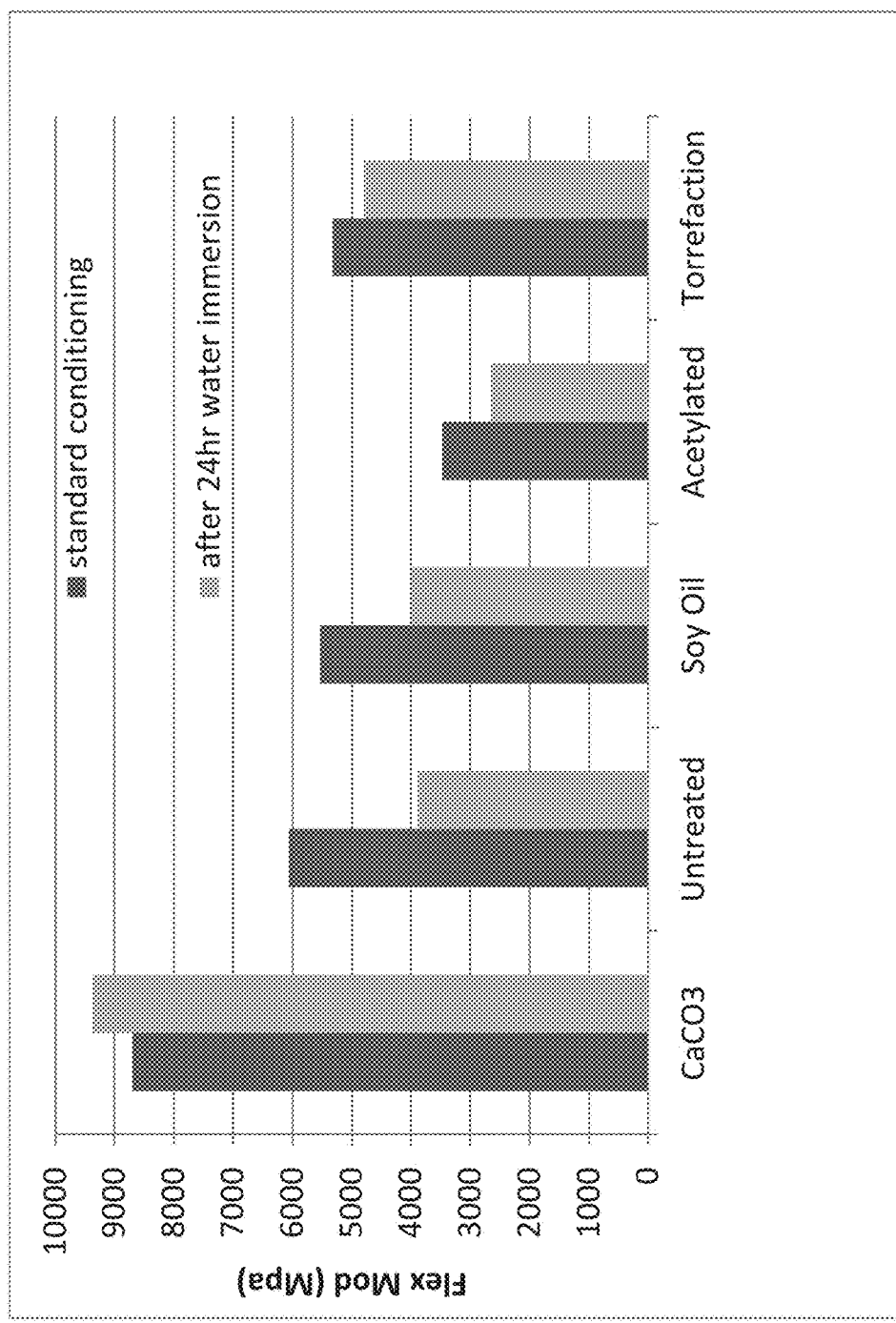
FIG. 7 provides a graph of the flexural modulus of BMC with treated soy flour.
Figure 8:
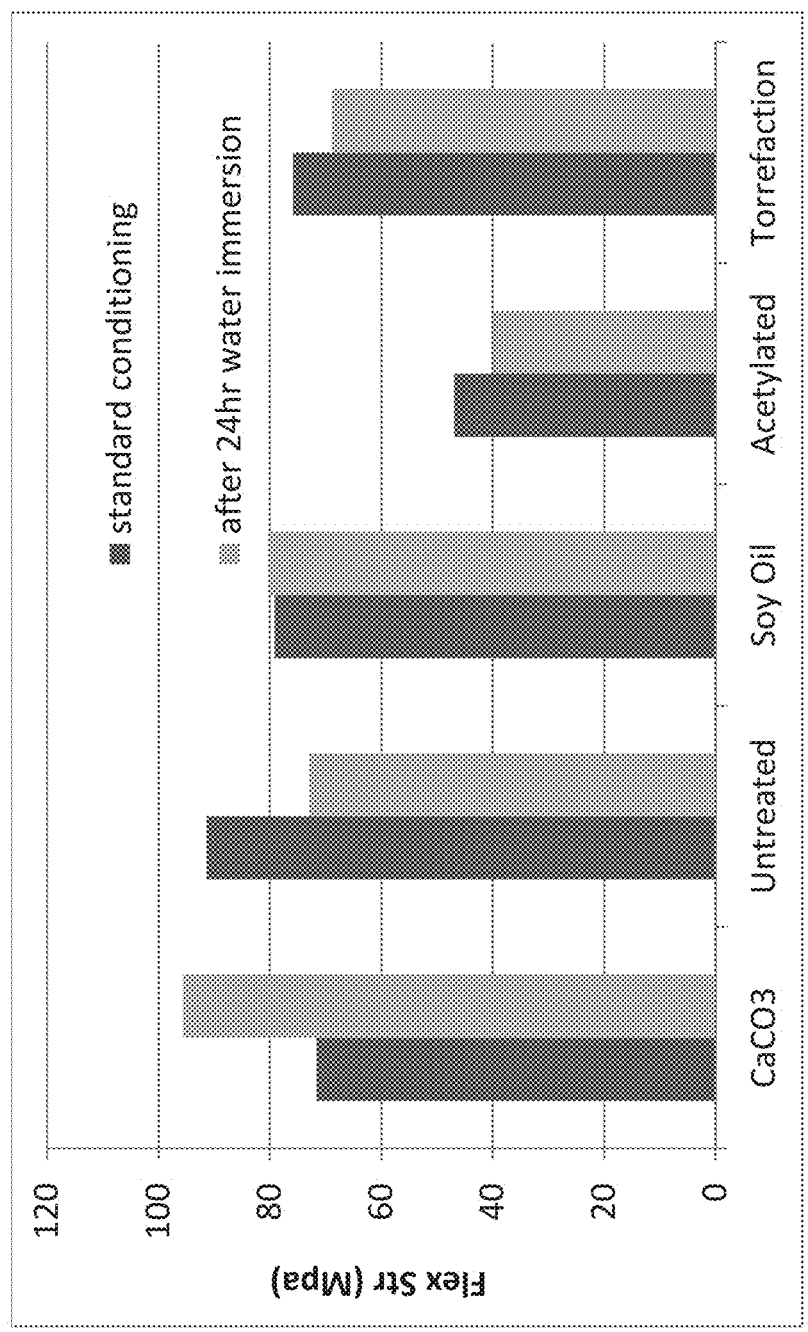
FIG. 8 provides a graph of the flexural strength of BMC with treated soy flour.

Plaques were molded and flexural properties with ambient conditioning, and after 24 hour water immersion, were tested. The results are shown in FIGS. 7 and 8.

Figure 9:
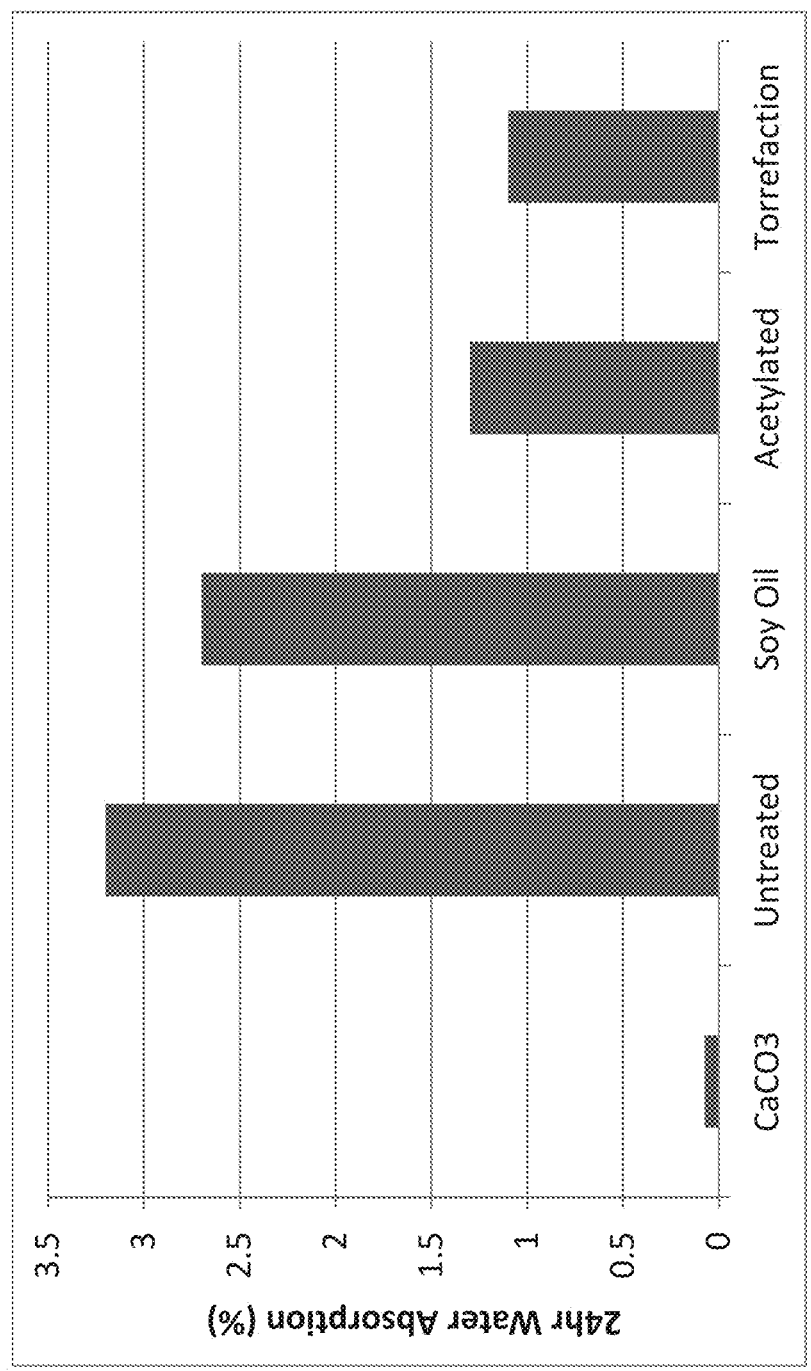
FIG. 9 provides a graph of water absorption of BMC with treated soy flour.

The flex strength of the untreated soy flour with standard conditioning was actually greater than that of the CaCO$_3$ control sample. This advantage, however, was eradicated after water immersion. After water exposure, the modulus was lower for all of the soy filler variations relative to the CaCO$_3$-filled sample. The modulus and strength of the CaCO$_3$ sample increased slightly, perhaps due to beneficial plasticization with water exposure, but all of the soy flour variations had decreases. As reported in FIG. 9, the water absorption of the soy oil treated, acetylated and torrefacted samples was reduced relative to the untreated soy flour sample.

Figure 10:
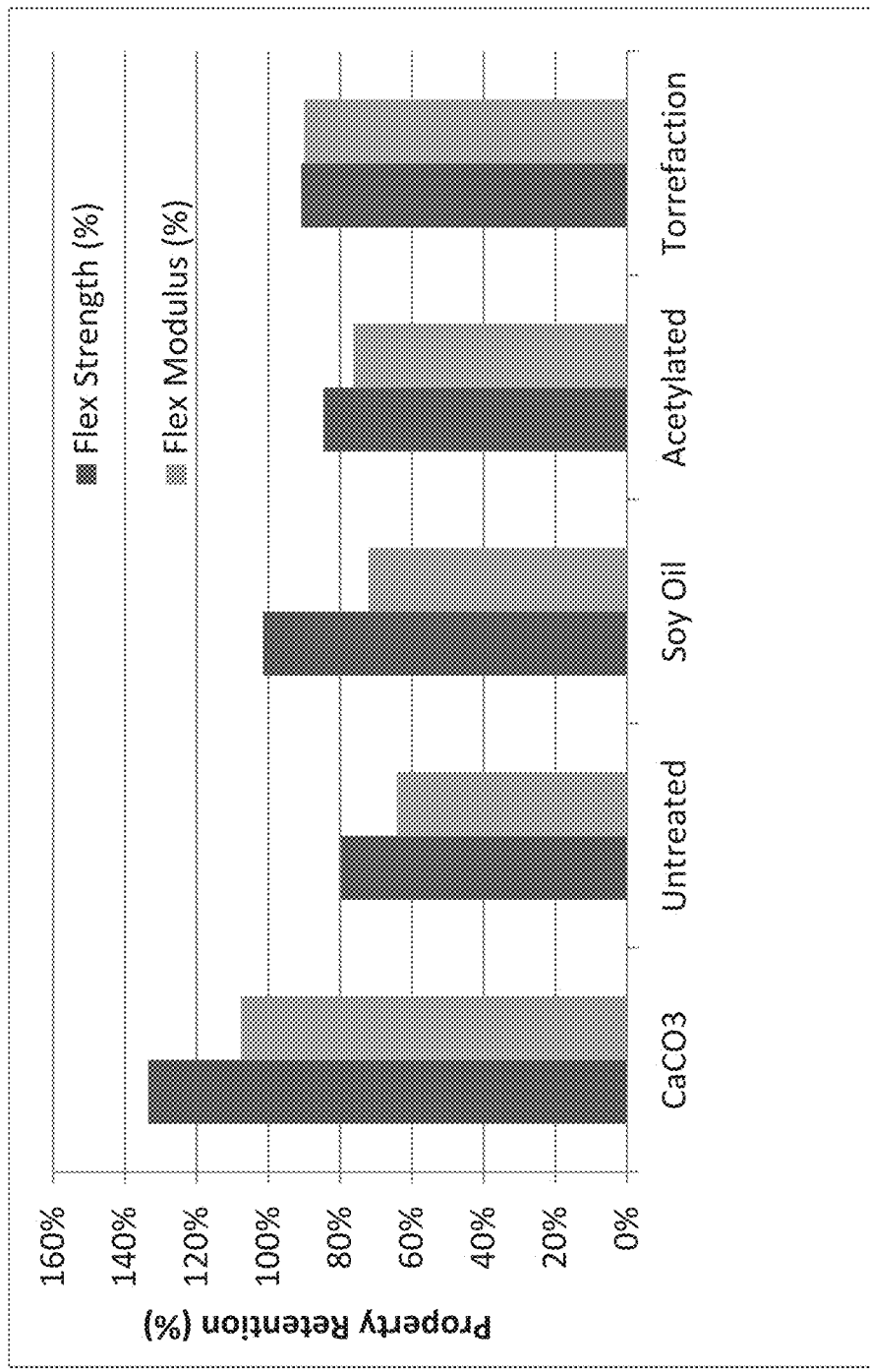
FIG. 10 provides a graph of flex strength retention of Wet BMC with BMC with treated soy flour.

The torrefacted and acetylated samples had the lowest water absorption, which was roughly a third of the untreated absorption. As seen in FIG. 10, the flex strength retention of all of the soy samples was in the 80 to 100% range, but the modulus of some samples fell to as low as 61%.

Figure 11:
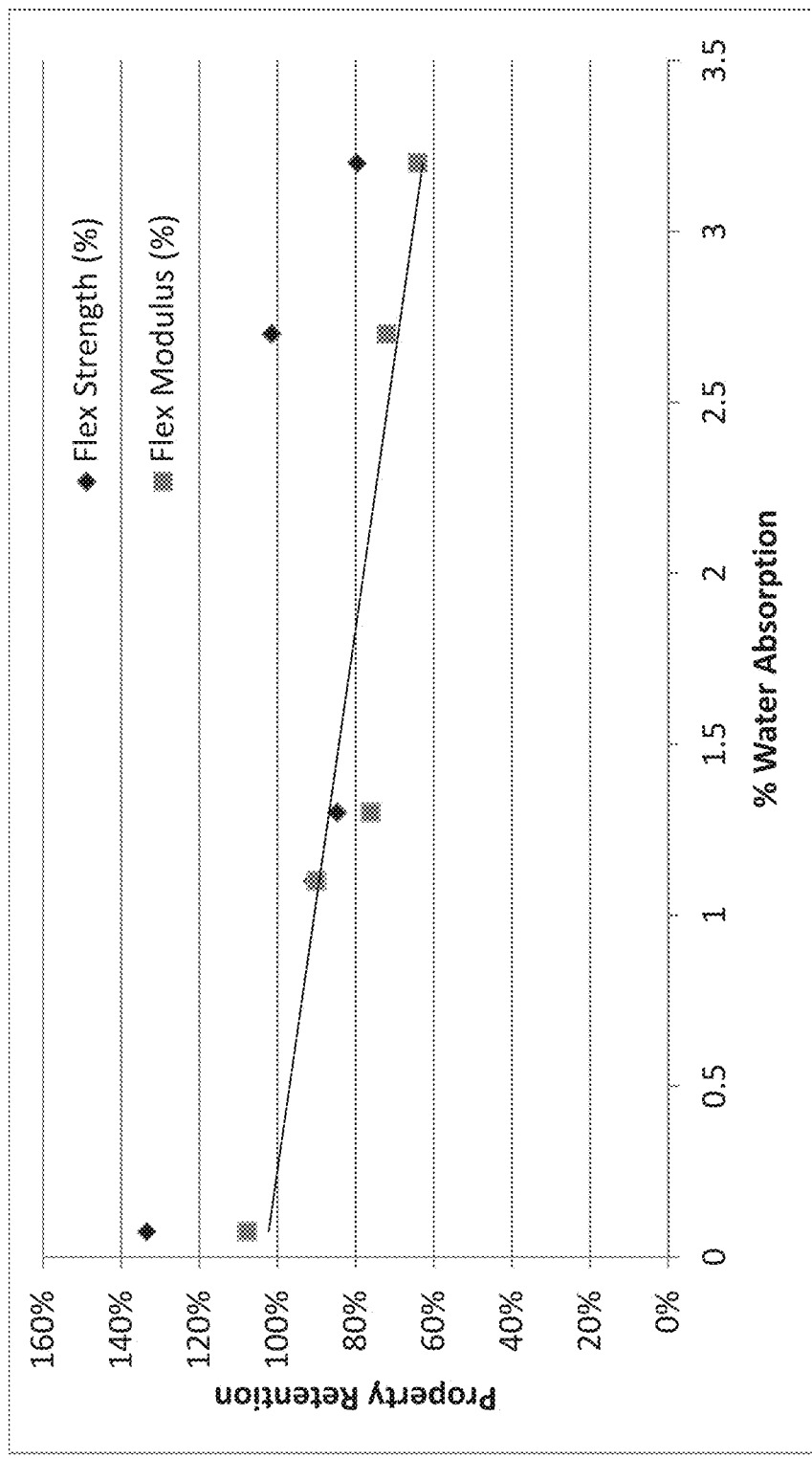
FIG. 11 provides a chart of the flex strength and modulus retention fo water absorption of one or more embodiments.

FIG. 11 demonstrates that the modulus retention depression correlates very well with the % water absorption.

Based on these results, work was focused on the commercialization of the heat treated soy filler as the primary path forward under USB grant 1340-512-5275.

The effect of water absorption on free radically cured Maleated Acrylated Epoxidized Soy Oil (MASEO) resin based bulk molding compounds (BMCs) with various fillers was evaluated using the formula from Table three. Flexural Modulus was tested.

TABLE THREE

BMC Formula

| Ingredients | Vol % |
|---|---|
| MAESO | 28.2 |
| LPA | 14.1 |
| Peroxide | 0.6 |
| Mold Release | 4.1 |
| Filler | 36.1 |
| ⅛" Glass Fiber | 17.0 |

Figure 4:
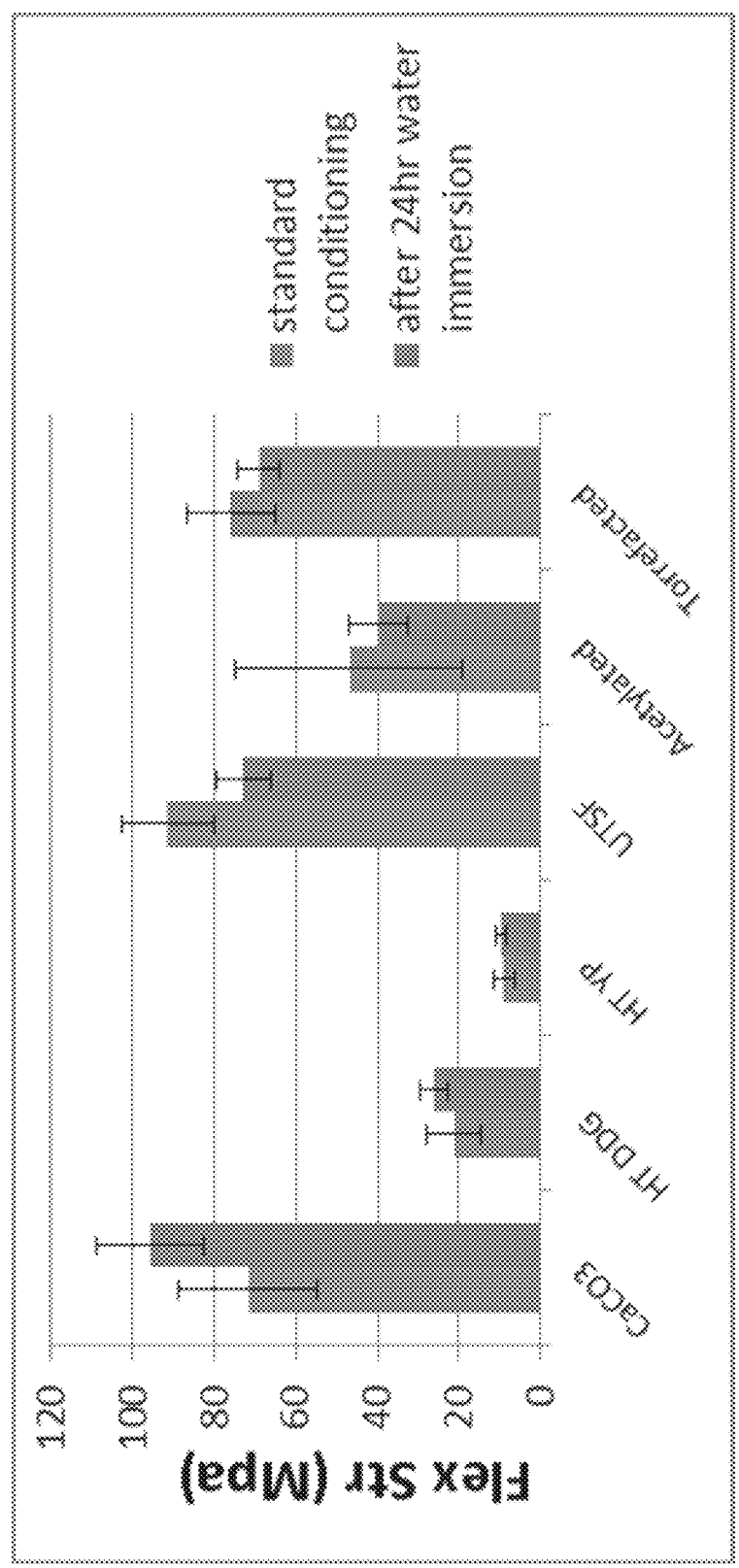
FIG. 4 provides a chart of flexural properties with ambient air conditioning and after a 24 h water immersion of various polymer compositions.
Figure 5:
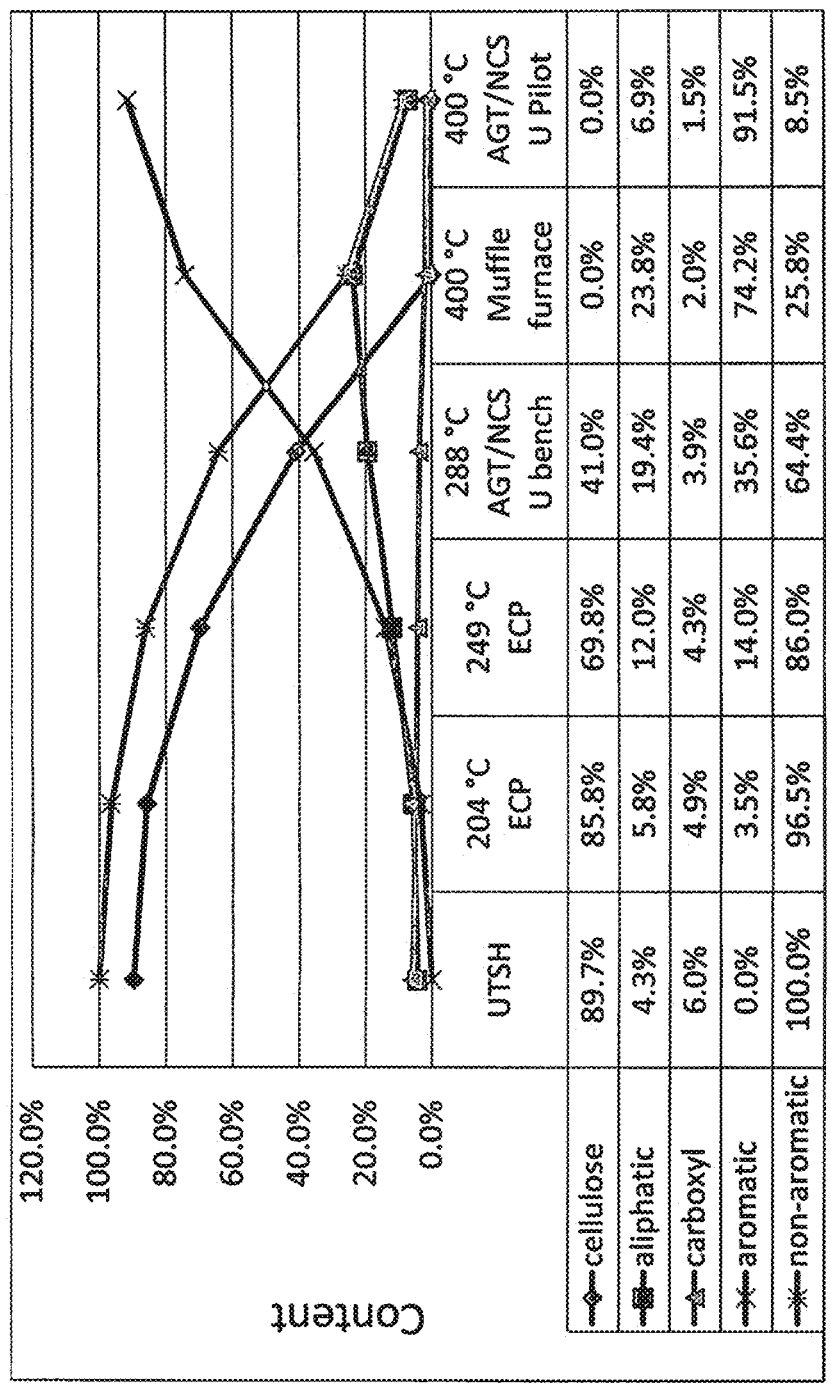
FIG. 5 provides a chart and graph of NMR results of heat treated soy hull fillers.

A CaCO3 filled BMC with volume equivalent loading was used as a control for comparison. For each material 3.2 mm thick plaques were molded at 150° C. for 2 min. Flexural properties with ambient air conditioning and after a 24 h water immersion were tested on cut specimen. The 24 h water absorption was also measured. Results are seen in FIG. 4.

The BMCs with heat treated dried distillery grains (HT DDGs) and heat treated yellow pine (HT YP) had poor mechanical performance. These are products which were being offered pre-commercially, at the time of evaluation. To achieve equivalent mechanical performance the substitution of filler with these products was limited to less than 30% of total filler volume loading. The problem presented is that there is a desire to use these low density bio-fillers at 100% loading to eliminate the high density mineral fillers. There has been a frustration with products offered in the past.

Water Absorption

Figure 12:
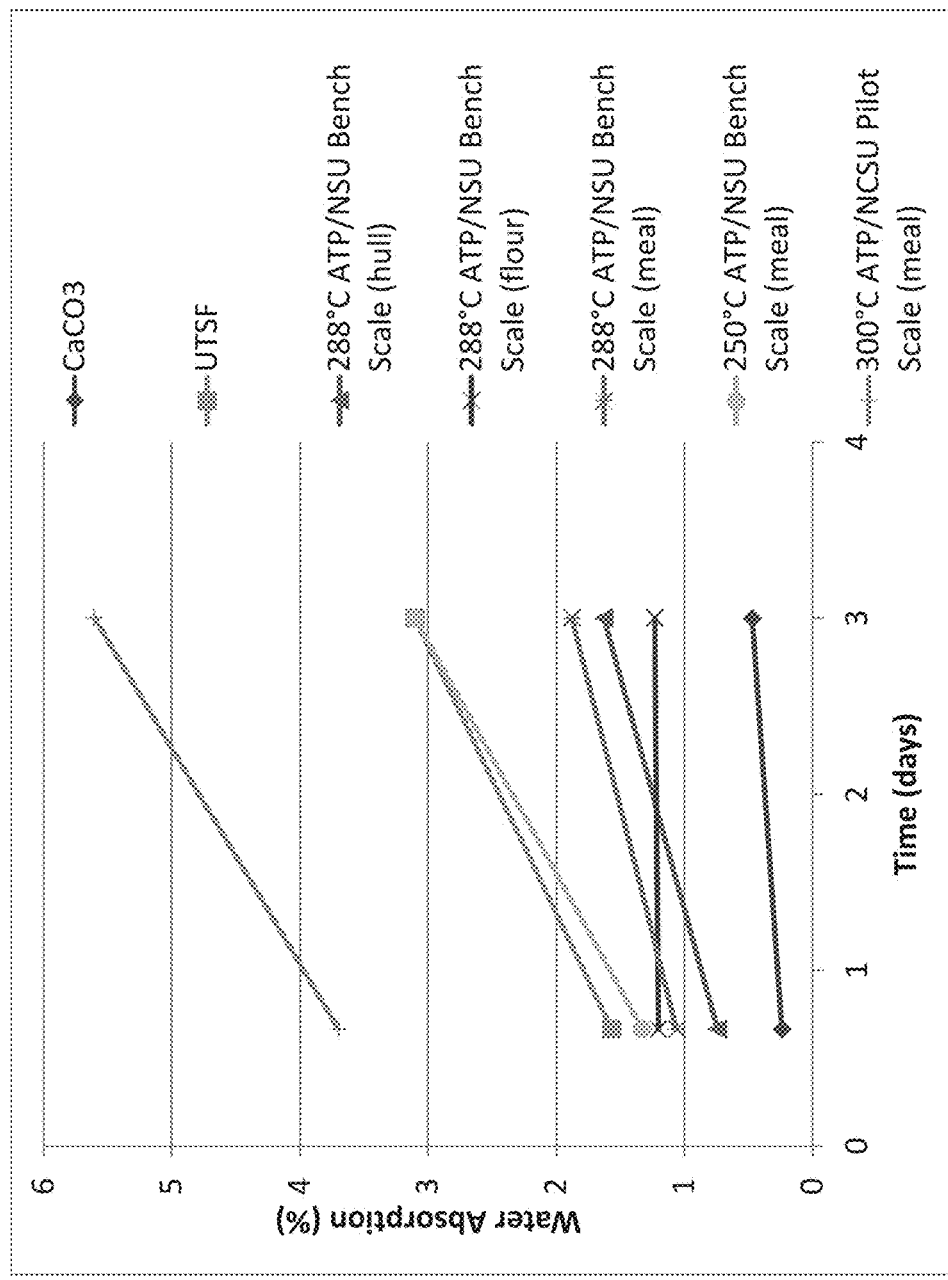
FIG. 12 provides a chart of the weight gain of resin casting with heat treated fillers.

In FIG. 12 water immersion weight gain data for a number of the torrefacted fillers is presented.

The most notable result is the poor performance of the 300° C. ATP/NCSU pilot meal sample which had roughly twice the water pickup of the UTSF filled sample. Also 250° C. processing of meal in the ATP/NCSU bench process was not effective in improving water absorption. At 3 days it had weight gain that was identical to the pickup of the UTSF sample. Another observation is that in the bench level studies, the hull sample had slightly lower water absorption than the meal sample, which was slightly lower than the sample with the flour. More testing would be needed to determine if the differences are significant but regardless it is advantageous that the lower cost hulls are a feasible precursor.

Figure 6:
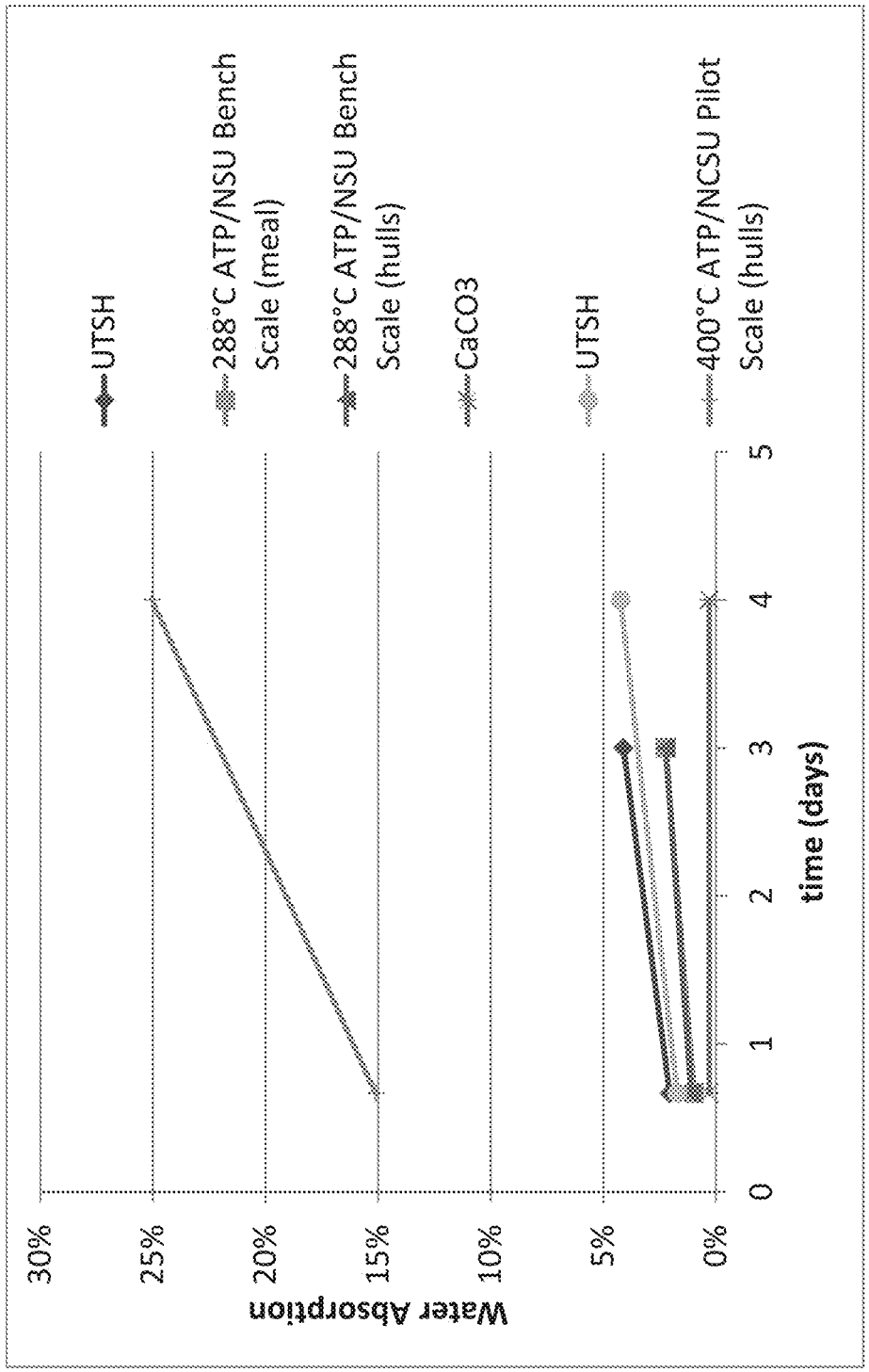
FIG. 6 provides a chart of resin casting water absorptions with various fillers.

In another water absorption screening the 8 um ground 400° C. ATP/NCSU pilot scale hulls was compared to rough ground bench processed hulls, UTSH and CaCO$_3$. It was noted that the 8 um ground 400° C. ATP/NCSU pilot scale hull samples inhibited the cure of the samples although eventually they did solidify. Results for water immersion weight gain are seen in FIG. 6 with the most notable observation being that the pilot scale hulls, like the pilot scale meal, had much higher water absorption than the bench samples treated at lower temperatures or even the untreated hulls.

BMC Study of Torrefacted Filler

BMCs with equivalent composite density of 1.45 g/cc were made using clay and the 3 grinds of the 500° C. ATP/NCSU batch unit soy hulls using a master blend seen in Table 4.

TABLE 4

Master Blend for BMC.

| Resin Master | Weight % |
|---|---|
| Resin | 37.9 |
| LPA | 25.4 |
| Styrene | 19.6 |
| Initiator | 1.5 |
| Inhibitor | 0.6 |
| Pigment | 9.2 |
| Mold Release | 5.8 |

BMC soy filled samples were comprised of 130 g master batch, 57 g filler and 113 g ⅛" chopped glass fiber. The clay filled controls were 160 g of master batch, 30 g filler and 113 g glass for similar final molded density of the composite. The clay filled plaque molded as expected, but the three torrefacted soy filler plaques had poor integrity and could be broken by hand, evidently because of severe undercure.

Figure 3:
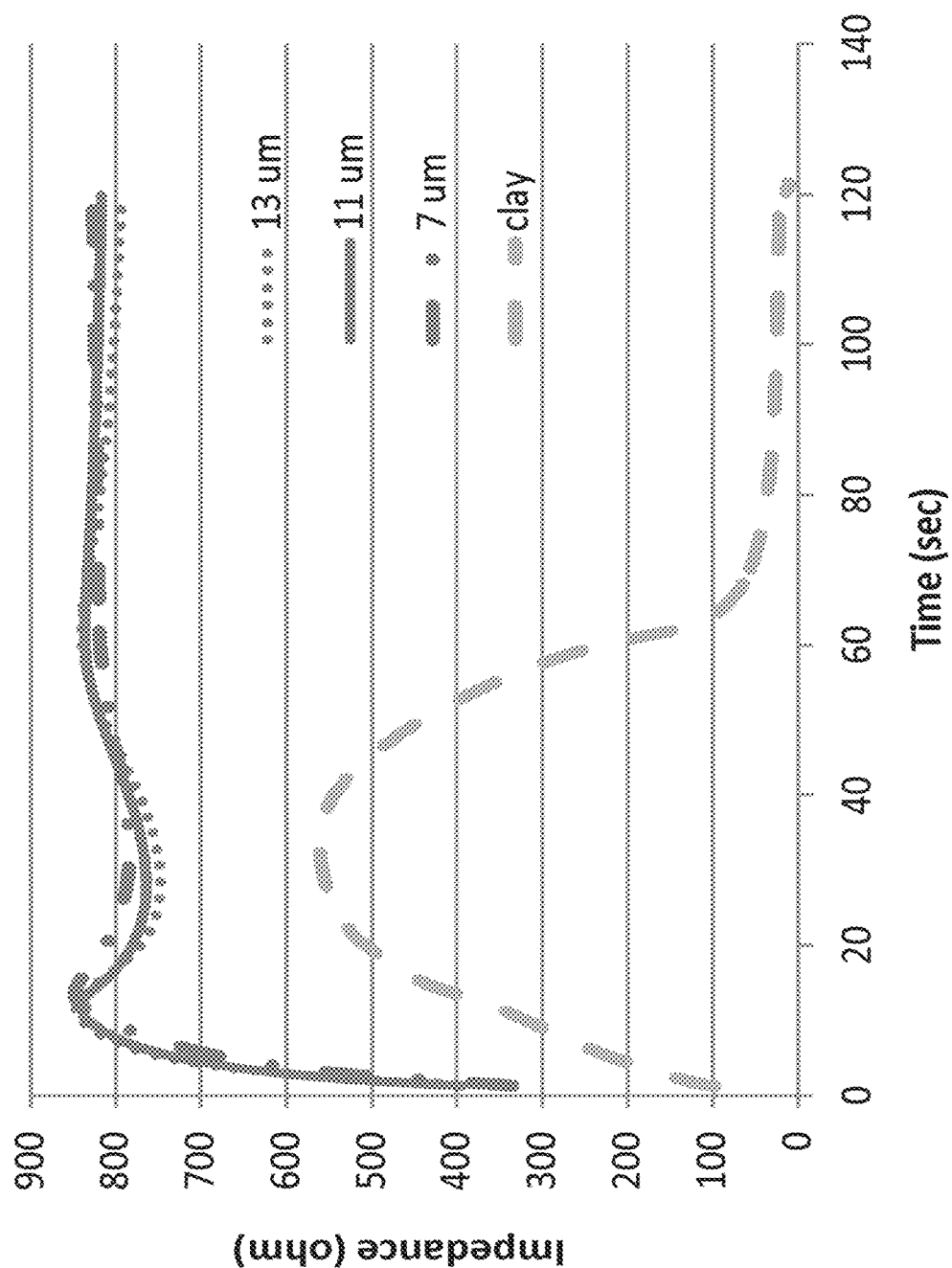
FIG. 3 provides a chart of dielectric impedance curves determined during the curing of filled polymer compositions of a biomass filler heat treated at 500° C. compared to clay.

The dielectric analysis (DEA) curves shown in FIG. 3 support this. The lower curve is of the clay filled BMC, which has a typical cure profile. All four samples had the expected initial rise in impedance. This rise is associated with increased dipole mobility due to the increase in temperature as heat is transferred from the mold to the BMC. However, the DEA curves of the three soy filler samples do not return to the baseline when the material cures and the dipole mobility would be reduced.

Possible Causes of Cure Inhibition

The cure inhibition first noted in the water absorption castings and manifested again in BMC is a significant concern. This phenomenon with biomass fillers in thermoset composites has precedence in the literature. Lee reports that even with large amounts of peroxide, LignoFil particles had a strong effect on the gel point of unsaturated polyester resins. Similarly, Pistor et al. found increases in activation energy of 50% in the presence of ground sisal fibers as a replacement for ground fiber glass in unsaturated polyester resins. Sawdust filler affected the completeness of cure, as evidenced by a decrease in T$_g$ with increasing loadings.[3] The cure issue also occurs with thermally treated biomass. Industry evaluation of both the Lignotech® and NeroPlast® fillers by Watt in thermoset molding compounds indicated promising results as a partial replacement for mineral filler. However, 100% replacement with these fillers affected the level of cure and resulted in significant reduction of properties, limiting the amount of green content and weight reduction. This cure inhibition phenomenon is the major reason that commercial adaptation of biomass fillers has not been successful in thermosets. Ironically, use of biomass fillers in thermoplastics has advanced even though the use of mineral fillers historically has been more common in thermosets.

The major components of bio-mass fillers are cellulose, saccharides and lignin or protein. The relative proportions of key components for biomass feedstock reported in the literature are summarized in Table 5.

TABLE 5

Biomass Precursor Composition.

| | % | | | | |
|---|---|---|---|---|---|
| | cellulose | other carbs | total carbs | protein | lignin | other |
| soft wood | 42 | 26 | 68 | | 30 | 2 |
| sisal | 34 | 38 | 72 | | 19 | 9 |
| DDGs | 36 | 15 | 51 | 30 | 9 | 10 |
| soy meal | 16 | 19 | 35 | 50 | | 15 |
| soy hulls | 70 | 13 | 83 | 13 | 3 | 1 |

Lignin in soft wood and sisal are significant, but lignin levels for soy are 3% or less. The differences in lignin content may be of importance because the chemical composition of lignin is an oxygenated structure with a significant number of aromatic rings.

It is hypothesized that control of aromatic species in the biomass filler can result in an effective thermoset filler. To accomplish this, a low lignin precursor, soy, is used and control of thermal processing to avoid aromatic structure development through cellulose rearrangement and cyclization is evaluated.

Lignin Effect on Inhibition

To determine the lignin contribution to inhibition, Kraft lignin (CAS Number 8068-05-1) was used as a model filler.

Figure 2:
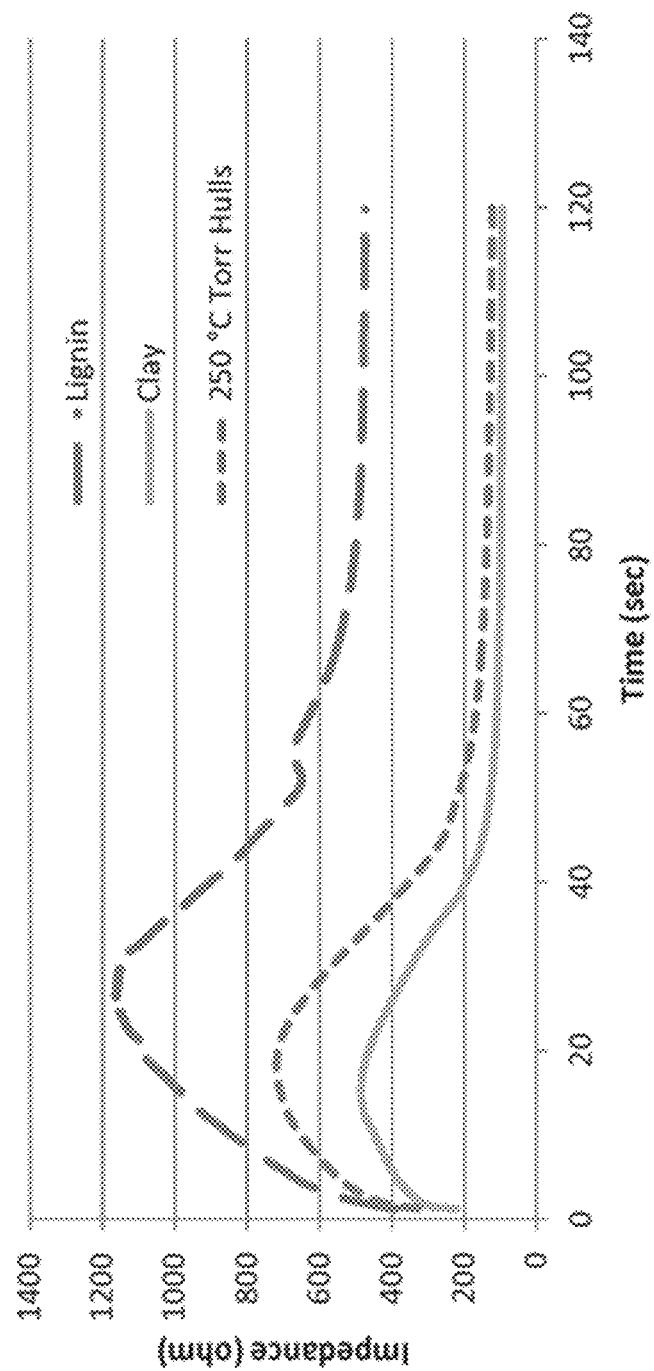
FIG. 2 provides a chart of dielectric impedance curves determined during the curing of filled polymer compositions of torrefaction treated soy hulls compared to clay and lignin.

A resin master using the formula from Table 3 was mixed. The lignin was dried for 2 days at 50° C. and then compounded into a BMC as previously described, along with a clay filled control and one filled with the 250° C. muffle furnace torrefacted hulls. The DEA curves are presented in FIG. 2.

The secondary peak seen on the lignin sample may or may not be significant, but the cure extension was significant, with the gel time increasing from 16 sec to 27 sec and the cure time extending from 63 sec to 92 sec. The inhibition with the 250° C. torrefacted sample was much smaller, with only an extension of a few seconds, which is generally not considered significant for this test method. This demonstrates that with controlled torrefaction, 100% of the mineral filler for thermosets can be replaced with filler produced from soy hulls without adverse affects on the polymerization reaction.

Thermogravimetric Analysis (TGA)

Figure 13:
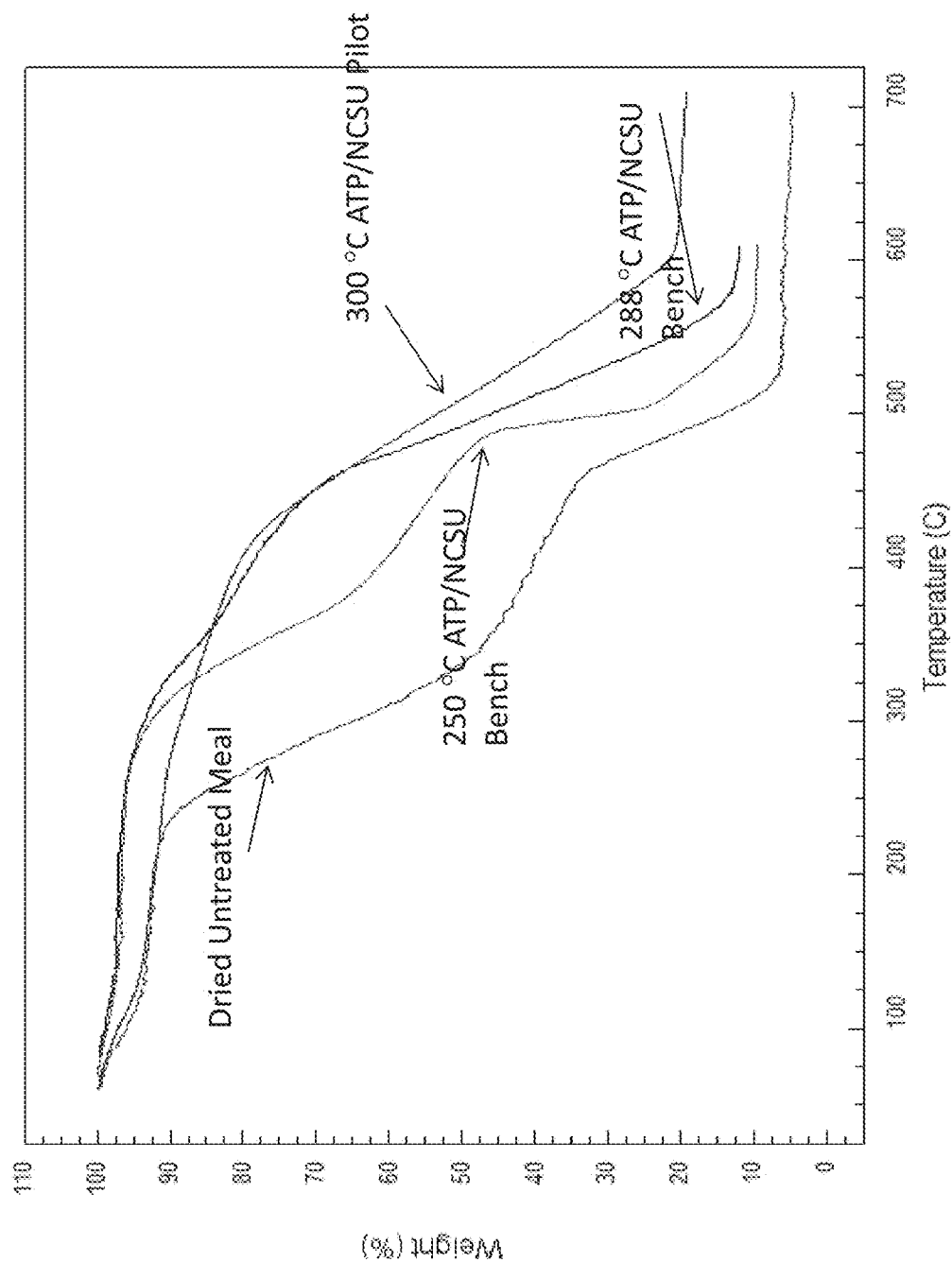
FIG. 13 provides a chart of TGA decomposition profiles of meal fillers.
Figure 14:
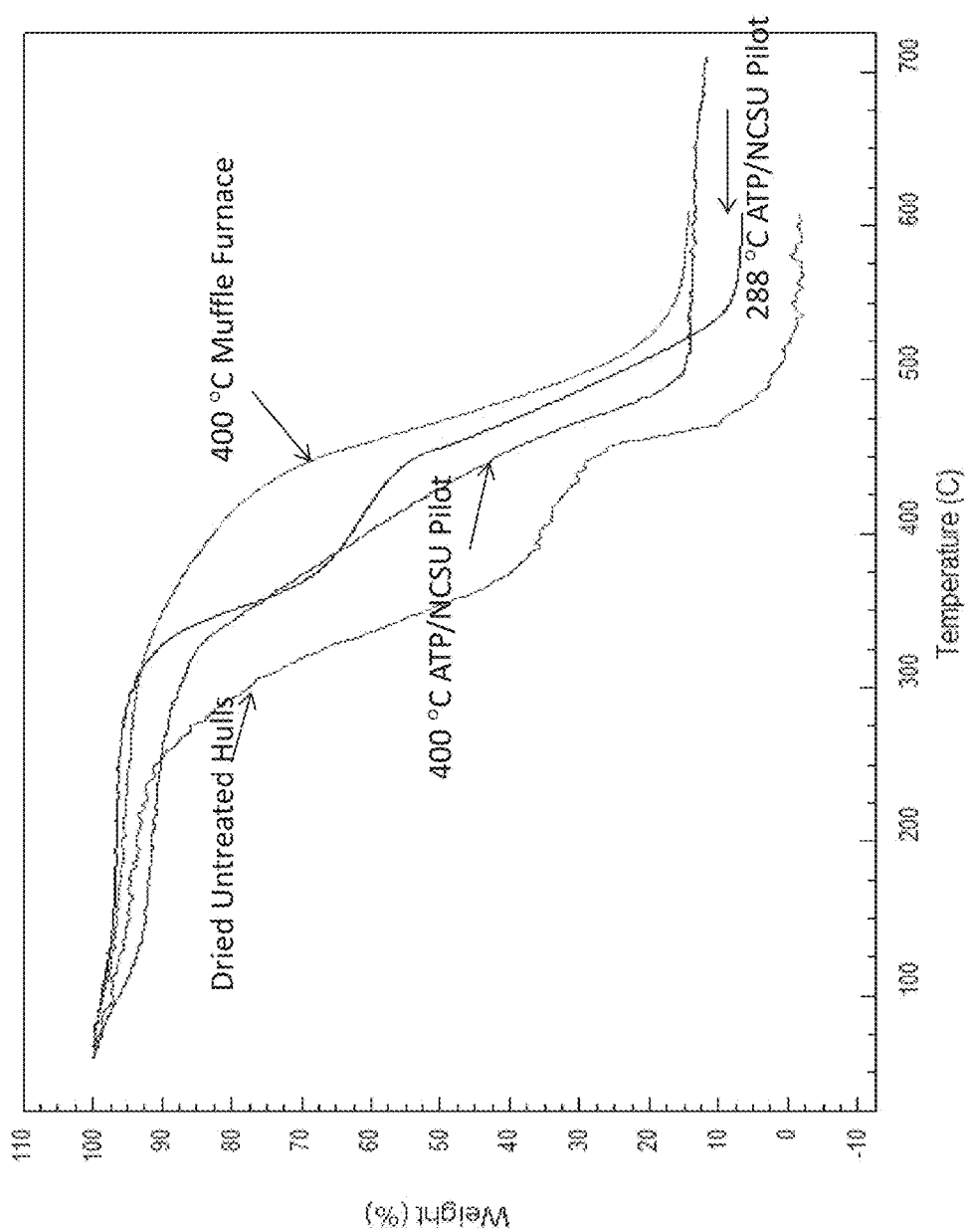
FIG. 14 provides a chart of TGA decomposition profiles of hull fillers.

FIGS. 13 and 14 present the weight loss curves for soy meal and hull fillers, respectively. The meal samples were dried untreated meal, 250° C. ATP/NCSU bench, 288° C. ATP/NCSU bench and 300° C. ATP/NCSU pilot fillers. The hull samples were untreated hulls, 288° C. ATP/NCSU bench scale, 400° C. muffle furnace and 400° C. ATP/NCSU pilot scale. All samples were dried under vacuum at 25° C. for two days prior to testing.

In the meal sample set, there is an increase in the final ash retention and final plateau temperature with increasing process temperature. The temperature stability up to 100° C., however, was lower for the highest process temperature sample produced in the ATP/NCSU pilot unit relative to the other heat treated fillers.

In the hull sample set, increasing process temperatures also yielded higher ash retention, but not higher plateau temperature. The 400° C. ATP/NCSU pilot sample plateaued at a lower temperature than the other heat treated fillers. It also lost weight at a much lower temperature than the other heat treated fillers. The 400° C. muffle furnace torrefied sample was the most stable, but the 400° C. ATP/NCSU pilot sample was less stable than the 288° C. ATP/NCSU bench torrefacted hulls. The low temperature weight loss at less than 100° C. suggests that there are low molecular weight species in the 400° C. ATP/NCSU torrefacted filler, and perhaps these species participate in the cure inhibition observed with aggressive torrefaction. The differences in the 400° C. ATP/NCSU and 400° C. muffle furnace processed samples indicates that peak process temperature alone does not dictate the stability of the resulting filler. While both environments were designed for oxygen exclusion, the continuous pilot process handling of off gasses is different from the nitrogen purge used in the muffle furnace. Other process differences were water quenching, wet grinding and smaller particle size of the pilot sample vs. the muffle furnace sample, which entailed rough dry grinding and oxygen excluded ambient cooling. More work is needed to understand the critical control parameters, as well as the nature of the low temperature volatiles indicated in the pilot sample.

Elemental Analysis (EA)

Elemental analysis of the combustion products of the fillers was used to quantify the level of torrefaction. The data is presented in Table 6 as the weight percent of each element divided by its atomic mass unit weight.

TABLE 6

Elemental Analysis Data.

| Sample | precursor | Elemental analysis (wt. %/amu) | | | |
|---|---|---|---|---|---|
| | | C | H | N | O |
| Dried Untreated Soy Meal | meal | 3.6 | 6.2 | 0.6 | 2.7 |
| 250° C. ATP/NSU Bench Scale | meal | 4.2 | 4.8 | 0.7 | 2.2 |
| 288° C. ATP/NSU Bench Scale | meal | 4.8 | 2.3 | 0.7 | 1.8 |
| 300° C. ATP/NSU Pilot Scale | meal | 4.7 | 0.8 | 0.5 | 2.2 |
| Dried Untreated Soy Hulls | hulls | 3.5 | 6.2 | 0.1 | 3.2 |
| 288° C. ATP/NSU Bench Scale | hulls | 4.6 | 4.8 | 0.1 | 2.4 |
| 400° C. Muffle Furnace | hulls | 5.2 | 2.3 | 0.2 | 2.1 |
| 400° C. ATP/NCSU Pilot Scale | hulls | 5.4 | 0.8 | 0.2 | 2.0 |

The heat treatments resulted in oxygen and hydrogen reduction, and increases in the carbon and nitrogen concentration. This supports the evolution of hydroxyl and carbonyl functionality from the system. Increasing the process temperature in the bench process with the meal precursor resulted in lower O/C and H/C ratios, but at 300° C. in the continuous pilot processor, the O/C ratio was greater than at the lower temperature, while the H/C continued to diminish, indicating cyclization. The hull precursor in different processors at 400° C. had a large difference in H/C. Lower H/C values are consistent with higher levels of aromatic ring formation and fusing. Therefore, fillers treated in different processors had very different compositions, which is consistent with the difference in stability observed in the TGA data. While the molar content of carbon, nitrogen and oxygen were similar, the hydrogen content was substantially lower for the AGT/NCSU pilot scale filler, suggesting that the AGT/NCSU pilot scale filler formed a higher level of aromatic structure in the char.

Fourier Transform Infrared Analysis (FTIR)

Heat Treated Hull Fillers

A fourier transform infrared spectra of the dried untreated hulls (UTSH 10-26), 288° C. ATP/NCSU bench torrefacted hulls (Bench Hulls 10-28), 250° C. muffle furnace hulls (250CmoHulls 11-15), and 500° C. ATP/NCSU pilot hulls (pilot hulls 1028) was obtained.

With increasing treatment temperatures, an aromatic peak at 880 cm$^{-1}$ forms as the aliphatic alkanes at 2925 cm$^{-1}$ diminish. The aliphatic alkene peak at 1660 cm$^{-1}$ shifts to the aromatic bond peak at 1600 cm$^{-1}$. The carbonyl peak at 1740 cm$^{-1}$ first increases in intensity relative to the double bond peak for lower temperature treatments, but disappears with the more aggressive thermal treatment. In spite of the higher process temperature of the 288° C. ATP/NCSU bench hulls, the 250° C. muffle furnace hulls appear to be more highly torrefied, supporting the earlier indications that there are other critical factors in the process that need consideration.

Extraction of Inhibiting Filler

In the TGA scans of highly torrefied material, low molecular weight species were implicated by the low temperature weight loss. It follows that these low molecular weight species might be soluble and prone to integration into the resin/styrene matrix chemistry. To test this, an extraction study was performed on the most aggressively torrefacted 500° C. ATP/NCSU batch hull sample, which had caused severe inhibition in compounded BMC.

A 10 g sample of the 500° C. ATP/NCSU batch filler in a 125 ml flask was extracted with 100 ml of toluene. Toluene was used because of its structural similarity to styrene. The slurry was stirred at ambient temperature for 6 h, and then filtered. The filtrate was a yellow brown liquid. This was dried in a tared beaker under vacuum overnight. The yield was 26 mg (0.26% based on filler). The residue was a brown oil with dark brown agglomerates. It was homogenized by stirring and an FTIR ATR spectrum was taken of it. The results of a library search found a 75% match to petroleum hydrocarbons and aromatic oils. The solubility of this aromatic extract in toluene suggests that it would also be soluble in styrene, and if oxygenated, would likely act as an inhibitor.

With time, the homogenized oil again separated, indicating a non-uniform composition. To try to resolve the different species in the oil, 4 ml of methanol was added. Upon stirring, a reddish brown solution formed and a black tar-like material separated from the solution. The solution was decanted and the MeOH was driven off in a vacuum oven, yielding 6 mg of oily brown residue. The tar was redissolved in 2 ml of toluene, transferred to a weighing dish and dried for a 9 mg yield of tar. The total combined yield from the separation was 58%. The FTIR spectra of the two residues demonstrate that they are chemically similar, and provide a 64% match to a spectrum of aromatic hydrocarbon resin. Since the structures are similar, it may be a difference in molecular weight that is affecting their solubility in MeOH.

Differential Scanning Calorimetry (DSC)

Differential Scanning calorimetry (DSC) was used to try to prove, or disprove, the hypothesis that the extractables are inhibiting agents, and to understand if both the oil and tar species have the same inhibiting effect. A master resin was made using 4 g S903 resin with 62 mg Trig 122C80 peroxide. To 1.3 g aliquots, 55 mg of either styrene alone (no res) or styrene with a 6 mg residue/1 g solution of the toluene-only soluble (toluene res) or MeOH soluble (MeOH res) residues were added. Isothermal DSC scans at 85° C. were recorded to compare timing of the curing exotherm. Both extracts induced similar shifts in the onset, peak and return to baseline relative to the styrene blank. The inhibition at this temperature and concentrations was roughly 9.5 min.

Evaluation of Various Torrefaction Temperatures

Armed with some direction on appropriate levels of torrefaction for a thermoset filler, a process series with moderate torrefaction temperatures of 204° C. (400 1-3-14), 227° C. (440 1-3-14), and 249° C. (480 1-3-14) were prepared at EarthCare Products (ECP) using their batch processor.

Even with the highest level of treatment at 249° C., the aromatic peak at 880 cm$^{-1}$ had not started to form. The aliphatic alkanes at 2925 cm$^{-1}$ are not greatly diminished, although the carbonyls at 1740 cm$^{-1}$ lost definition with the higher torrefaction temperatures. The aliphatic alkene peak at 1660 cm$^{-1}$ shifted to the aromatic bond peak at 1600 cm$^{-1}$. Based on this data, it appears that the ECP 249° C. sample did not reach the same level of conversion as the muffle furnace 250° C. sample, even though the registered exotherm maximum was higher. This could be related to the larger sample sizes, the tumbling or the atmosphere in the ECP torrefactor.

The dielectric impedance curves for the BMCs made with this group of fillers are shown in FIG. 1 with dried untreated soy hulls and clay controls.

Figure 15A:
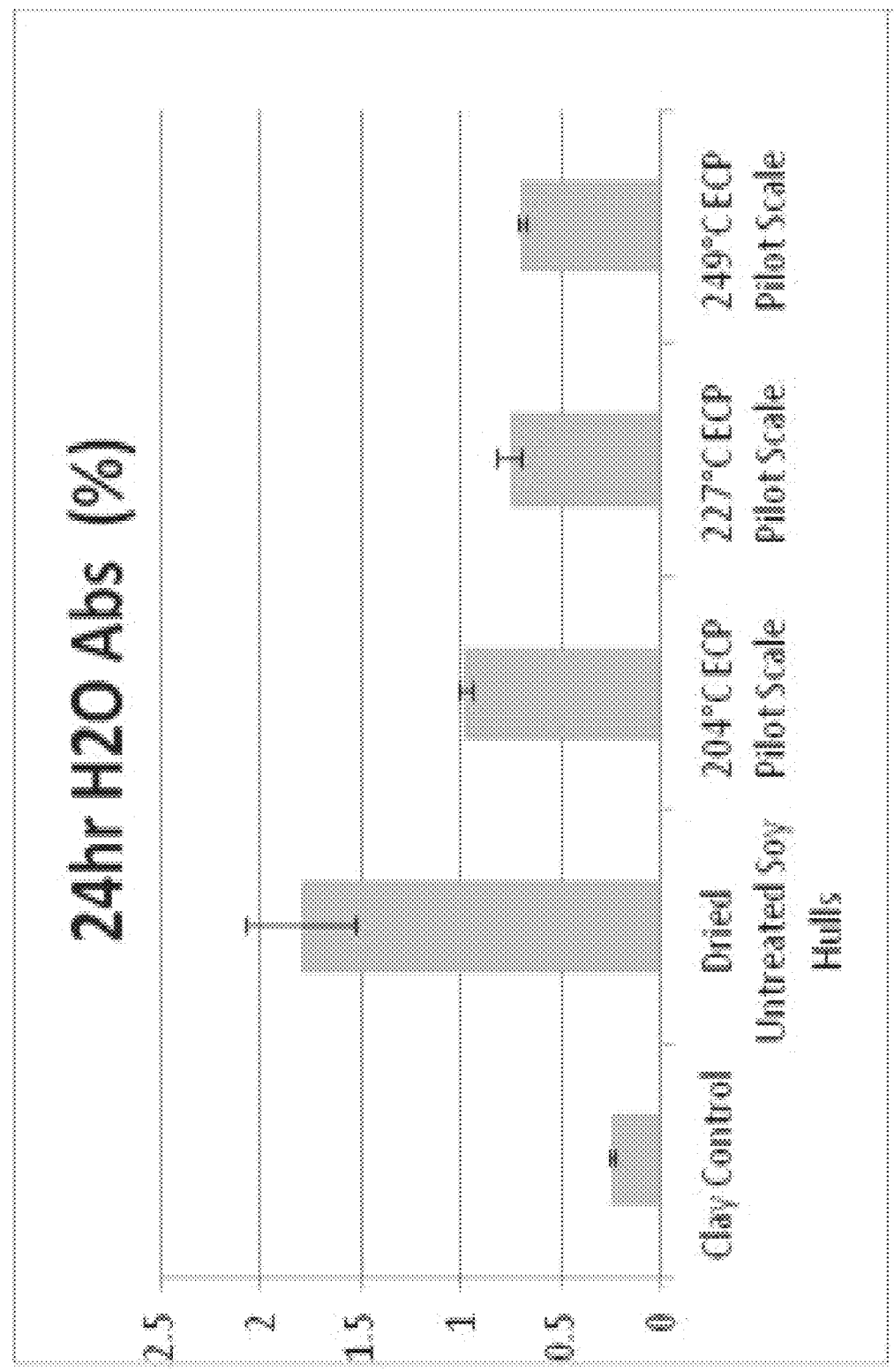
FIG. 15A provides a graph of the effects of water abortion on BMC flexural properties.
Figure 15B:
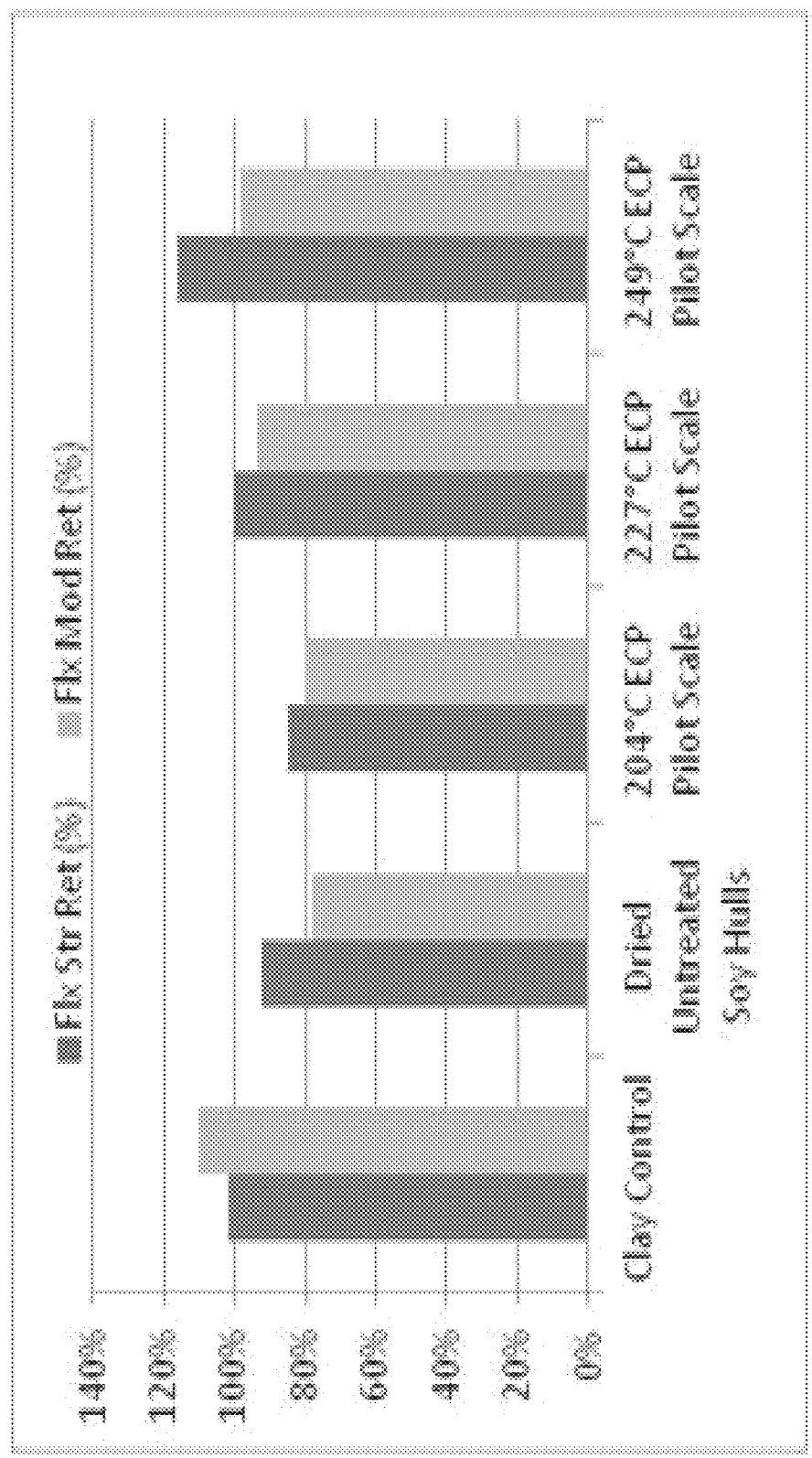
FIG. 15B provides a graph of the effects of water abortion on BMC flexural properties.

No apparent inhibition was observed for any of the samples, indicating that this range of temperatures results in acceptable thermoset fillers. All of the torrefacted samples had slightly lower as-molded strength relative to the clay and untreated soy hull filled samples. The as-molded modulus, however was similar to the clay control. The best balance of initial properties and retention of properties after the water soak was the 249° C. ECP pilot scale sample, which correlated inversely to the water absorption as shown in FIGS. 15A and 15B.

SMC Mechanical Properties

SMC was manufactured using the 204° C. ECP pilot scale filler ground to MA=8 um with the volumetric formula in Table 7.

TABLE 7

SMC Formula

| SMC Formula | (vol. %) |
|---|---|
| Resin | 21.8 |
| LPA | 14.5 |
| Styrene | 5.5 |
| Initiator | 0.5 |
| Inhibitor | 0.1 |
| Pigment | 2.4 |

TABLE 7-continued

SMC Formula

| SMC Formula | (vol. %) |
|---|---|
| Mold Release | 2.3 |
| Thickener | 0.9 |
| Filler | 32.4 |
| Glass fiber | 19.6 |

The mechanical properties of commercial semistructural standard density and low density SMC products are compared in Table 8.

TABLE 8

SMC Performance Comparison

| Property | Units | Standard Density | Glass Bubble Low Density | Low Filler Low Density | Soy Filler Low Density |
|---|---|---|---|---|---|
| BBC | (%) | 0 | 13 | 0 | 40 |
| Density | (g/cc) | 1.9 | 1.2 | 1.5 | 1.5 |
| Flexural Strength | (Mpa) | 240 | 160 | 220 | 215 |
| Flexural Modulus | (Mpa) | 13000 | 7000 | 8000 | 10000 |
| Tensile Strength | (Mpa) | 85 | 65 | 100 | 90 |
| Tensile Modulus | (Mpa) | 13000 | 8000 | 8500 | 10200 |
| Notched Izod | (J/m) | 950 | 700 | 1100 | 1175 |
| H$_2$O abs | (%) | 0.03 | 0.2 | 0.6 | 0.7 |
| Relative cost | (/m$^3$) | 1 | 1.17 | 1.38 | 1.05 |

The soy filler SMC is projected to be cost neutral to the standard density SMC with a 20% weight reduction. Other means to achieve low density include the use of hollow glass bubbles and reduced filler loadings. These strategies result in a significant cost premium relative to standard density products. The mechanical performance of the soy filler SMC was also closer to par with the standard density SMC. While there is a minor sacrifice in modulus when you replace the mineral filler with soy filler, the decrease relative to other low density products is not as great. Toughness is enhanced with the soy filler, as evidenced by improved Izod impacts. The soy filler product has the added benefit of high bio-based carbon (BBC) content, providing a favorable carbon footprint and life cycle impact on the environment.

A summary table for the examples presented is seen in Table 9.

TABLE 9

Summary of example data

| Filler | % lignin | % aromatic | inhibiting? | evidence of inhibiton |
|---|---|---|---|---|
| soy meal | 0 | 0 | no | |
| soy hulls | 3 | 1.5 | no | |
| DDGs | 9 | 4.5 | | not tested |
| miscanthus | 26 | 13 | no | |
| kraft lignin | 100 | 50 | yes | DEA gel time extended |
| heat treated DDGs | unknown | unknown | yes | poor mechanical performance |
| heat treated YP | unknown | unknown | yes | poor mechanical performance |
| heat treated miscantus | unknown | unknown | yes | lower T$_g$ |
| 204° C. heat treated soy | unknown | 3.5 | no | |
| 249° C. heat treated soy | unknown | 14 | no | |
| 288° C. heat treated soy | unknown | 35.6 | no | |
| 400° C. heat treated soy | unknown | 74.2 | yes | high water absorption |

TABLE 9-continued

Summary of example data

| Filler | % lignin | % aromatic | inhibiting? | evidence of inhibiton |
|---|---|---|---|---|
| 400° C. heat treated soy | unknown | 91.5 | yes | slow cure & high water absorption |
| 500° C. heat treated soy | unknown | unknown | yes | DEA lack of cure |

Based on this analysis the adverse effects on the free radical and ionic cure chemistries, has an onset threshold between 36 and 50% aromatic content. At 50% the effect is fairly minor, but as the content increases it becomes major, to the point where cure is retarded in addition to inhibited. Therefore, by controlling the aromatic content to below 49% formulations with 100% bio-filler can be realized.

What is claimed is:

1. A filled polymer composition comprising:
   (i) about 15% to about 50% by weight of the filled polymer composition is a plant biomass filler comprising a plant biomass with less than 49% by weight aromatic carbon content, wherein the plant biomass filler is selected from soy and *miscanthus*, wherein the plant biomass is prepared by heat treating plant matter in its natural state, optionally reduced in size by cutting or grinding, where the heat treating is performed at a temperature from about 150° C. to about 375° C.; and
   (ii) about 85% to about 50% by weight of the filled polymer composition is a chain-polymerized thermoset polymer.

2. The filled polymer composition of claim 1, where the plant biomass filler comprises a plant biomass with less than 40% by weight aromatic carbon content.

3. The filled polymer composition of claim 1, where the plant biomass filler comprises a plant biomass with less than 36% by weight aromatic carbon content.

4. The filled polymer composition of claim 1, where the plant biomass filler consists of a plant biomass with less than 49% by weight aromatic carbon content.

5. The filled polymer composition of claim 1, where the filled polymer composition includes about 20% to about 50% by weight of a plant biomass filler.

6. The filled polymer composition of claim 1, where the plant biomass has less than 8% by weight lignin content.

7. The filled polymer composition of claim 1, where the chain-polymerized thermoset polymer is selected from free-radical cured and ionically cured systems.

8. A composite material comprising
   a fiber, particulate filler, or combination thereof, and
   the filed polymer composition of claim 1.

9. The composite material of claim 8, where the composite material further includes an inhibitor, accelerator, catalyst, pigment, dye, mold release agent, thixotrope, rheology modifier, compatibilizing agents, or combination thereof.

10. A method of preparing a filled polymer composition comprising:
    (i) preparing a plant biomass filler by heat treating plant matter in its natural state, optionally reduced in size by cutting or grinding, at a temperature from about 150° C. to about 375° C., wherein the plant biomass filler is selected from soy and *miscanthus*;
    (ii) preparing the a resin blend by mixing the plant biomass filler, and a chain-polymerizable thermoset polymer precursor, where the plant biomass filler is from about 15% to about 50% by weight of the resin blend and the chain-polymerizable thermoset polymer precursor is from about 85% to about 50% by weight of the resin blend;
    (iii) polymerizing the chain-polymerizable thermoset polymer precursor via a chain-growth polymerization.

11. The method of claim 10, where the plant biomass has been processed to reduce the lignin aromatic carbon content by removal of lignin.

12. The method of claim 10, where the plant biomass has less than 8% by weight lignin content.

13. A filled polymer composition comprising:
    (i) a filler where the total filler content consists of a plant biomass with less than 49% by weight aromatic carbon content, wherein the plant biomass filler is selected from soy and *miscanthus*, wherein the plant biomass is prepared by heat treating plant matter in its natural state, optionally reduced in size by cutting or grinding, where the heat treating is performed at a temperature from about 150° C. to about 375° C.; and
    (ii) a chain-polymerized thermoset polymer.

14. The filled polymer composition of claim 1, where plant biomass has average particle size from about 0.5μ to about 50,000μ.

15. The method of claim 10, where plant biomass has average particle size from about 0.5μ to about 50,000μ.

16. The filled polymer composition of claim 13, where plant biomass has average particle size from about 0.5μ to about 50,000μ.

17. The filled polymer composition of claim 1, where plant biomass is prepared by heat treating plant matter in its natural state that has been ground into a flour.

* * * * *